(12) United States Patent
Hwang et al.

(10) Patent No.: US 11,036,342 B2
(45) Date of Patent: Jun. 15, 2021

(54) TOUCH DISPLAY DEVICE AND TOUCHSCREEN PANEL

(71) Applicant: LG Display Co., Ltd., Seoul (KR)

(72) Inventors: KwangJo Hwang, Paju-si (KR); DeukSu Lee, Paju-si (KR); JaegYun Lee, Paju-si (KR); Yangsik Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/397,955

(22) Filed: Apr. 29, 2019

(65) Prior Publication Data
US 2019/0258343 A1    Aug. 22, 2019

Related U.S. Application Data

(63) Continuation of application No. 15/822,464, filed on Nov. 27, 2017, now Pat. No. 10,324,575.

(30) Foreign Application Priority Data

Jun. 1, 2017    (KR) .................. 10-2017-0068354

(51) Int. Cl.
*G06F 3/044*    (2006.01)

(52) U.S. Cl.
CPC .......... *G06F 3/0446* (2019.05); *G06F 3/0445* (2019.05); *G06F 2203/04112* (2013.01)

(58) Field of Classification Search
CPC ........... G06F 2203/04112; G06F 3/044; G06F 3/0445; G06F 3/0446
See application file for complete search history.

(56) References Cited

U.S. PATENT DOCUMENTS

| 9,280,244 B2 | 3/2016 | Lee et al. |
| 9,575,583 B2 | 2/2017 | Woo et al. |
| 9,612,101 B2 | 4/2017 | Sleeman |

(Continued)

FOREIGN PATENT DOCUMENTS

| CN | 102262474 A | 11/2011 |
| CN | 102479011 A | 5/2012 |

(Continued)

OTHER PUBLICATIONS

Extended European Search Report, European Patent Application No. 17210116.4, dated Jun. 4, 2018, eleven pages.

(Continued)

*Primary Examiner* — Dmitriy Bolotin
(74) *Attorney, Agent, or Firm* — Fenwick & West LLP

(57) ABSTRACT

A touch display device and a touchscreen panel. Even in the case in which touch electrodes have different sizes or shapes or a located in different positions, a difference in capacitance is not formed among the touch electrodes. High touch sensitivity can be obtained. The touch display device comprises a plurality of touch electrodes, wherein a first touch electrode of the plurality of touch electrodes occupies a first area and comprises first mesh-shaped electrode metal. The touch display device comprises first dummy metal in a same layer as the first mesh-shaped electrode metal and in the first area occupied by the first touch electrode, the first dummy metal being electrically disconnected from the first mesh-shaped electrode metal.

34 Claims, 20 Drawing Sheets

(56) References Cited

U.S. PATENT DOCUMENTS

| | | |
|---|---|---|
| 9,671,886 B2 | 6/2017 | Yoo et al. |
| 9,715,323 B2 | 7/2017 | Lee et al. |
| 9,891,775 B2 | 2/2018 | Yoo et al. |
| 2011/0102370 A1 | 5/2011 | Kono et al. |
| 2011/0291963 A1 | 12/2011 | Woo et al. |
| 2011/0310033 A1 | 12/2011 | Liu et al. |
| 2012/0133613 A1 | 5/2012 | Chen et al. |
| 2013/0015865 A1 | 1/2013 | Izumi |
| 2013/0044384 A1 | 2/2013 | Kim et al. |
| 2014/0054070 A1 | 2/2014 | Ichiki |
| 2014/0152579 A1 | 6/2014 | Frey |
| 2014/0152580 A1 | 6/2014 | Weaver et al. |
| 2014/0253499 A1 | 9/2014 | Lee et al. |
| 2015/0054803 A1 | 2/2015 | Yashiro et al. |
| 2015/0060125 A1 | 3/2015 | Stevenson et al. |
| 2015/0062449 A1 | 3/2015 | Park |
| 2015/0169121 A1* | 6/2015 | Yao .................. G06F 3/0445 345/174 |
| 2015/0261370 A1 | 9/2015 | Yoo et al. |
| 2016/0048248 A1 | 2/2016 | Na et al. |
| 2016/0117031 A1 | 4/2016 | Han et al. |
| 2016/0147340 A1 | 5/2016 | Lee et al. |
| 2016/0216838 A1 | 7/2016 | Aina et al. |
| 2016/0274727 A1 | 9/2016 | Nakamura |
| 2017/0090634 A1 | 3/2017 | Yang et al. |
| 2017/0090644 A1* | 3/2017 | Yao .................. G06F 3/04164 |
| 2017/0097700 A1 | 4/2017 | Kim et al. |
| 2017/0108964 A1 | 4/2017 | Sato |
| 2017/0177118 A1 | 6/2017 | Nukui |
| 2017/0185224 A1 | 6/2017 | Nagata et al. |
| 2017/0220157 A1 | 8/2017 | Yoo et al. |
| 2017/0235393 A1* | 8/2017 | Son .................. G06F 3/044 345/174 |
| 2018/0011598 A1* | 1/2018 | Ku .................. G06F 3/04166 |
| 2018/0059869 A1* | 3/2018 | Ma .................. H01L 27/323 |
| 2018/0061898 A1* | 3/2018 | Oh .................. H01L 27/3297 |
| 2018/0095566 A1* | 4/2018 | Lee .................. G06F 3/044 |
| 2018/0095584 A1* | 4/2018 | Lee .................. H01L 27/3213 |
| 2018/0107304 A1 | 4/2018 | Hara et al. |
| 2018/0151627 A1* | 5/2018 | Seo .................. G06F 3/044 |
| 2018/0348930 A1* | 12/2018 | Lee .................. G02F 1/13338 |
| 2019/0294282 A1* | 9/2019 | Dun .................. G06F 3/0416 |
| 2020/0301544 A1* | 9/2020 | Jeong .................. G06F 3/0445 |

FOREIGN PATENT DOCUMENTS

| | | |
|---|---|---|
| CN | 103294311 A | 9/2013 |
| CN | 204302941 U | 4/2015 |
| CN | 104915077 A | 9/2015 |
| EP | 2815294 A1 | 12/2014 |
| GB | 2499388 A | 8/2013 |
| JP | 2015-049888 A | 3/2015 |
| JP | 2015-121829 A | 7/2015 |
| JP | 2016-001408 A | 1/2016 |
| TW | 201437895 A | 10/2014 |
| TW | 201604735 A | 2/2016 |
| TW | 201705155 A | 2/2017 |
| WO | WO 2011/142332 A1 | 11/2011 |
| WO | WO 2014/181774 A1 | 11/2014 |
| WO | WO 2015/182473 A1 | 12/2015 |

OTHER PUBLICATIONS

Japanese Office Action with concise explanation of relevance, Japanese Patent Application No. 2017-245653, dated Feb. 21, 2019, 8 pages.

United States Office Action, U.S. Appl. No. 15/822,464, dated Nov. 2, 2018, 10 pages.

* cited by examiner

Mesh Type TE

Mesh Type TE

Mesh Type TE

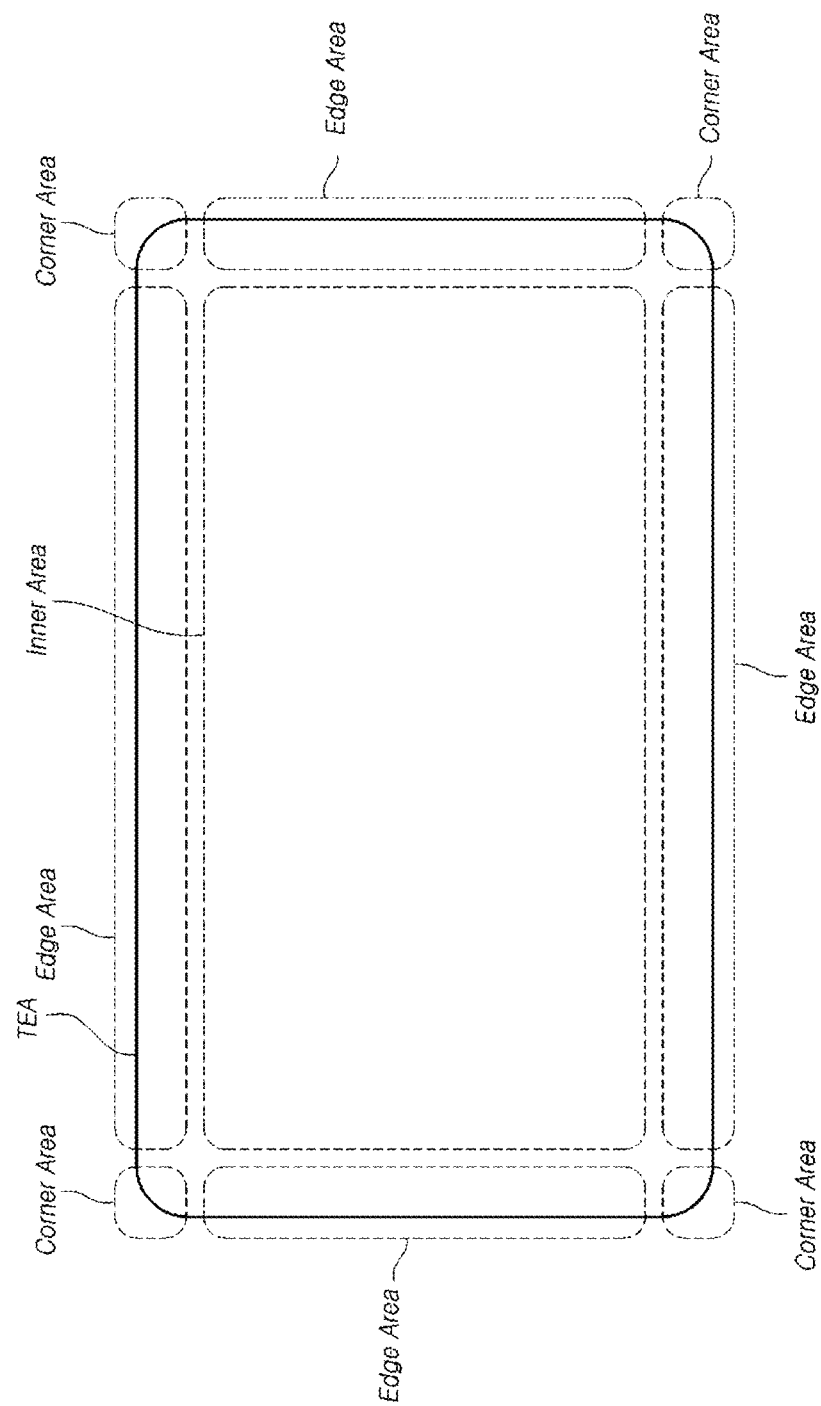

Corner Area

TOUCH DISPLAY DEVICE AND TOUCHSCREEN PANEL

CROSS REFERENCE TO RELATED APPLICATION

This application is a continuation application of U.S. patent application Ser. No. 15/822,464 filed on Nov. 27, 2017, which claims priority from Korean Patent Application No. 10-2017-0068354, filed on Jun. 1, 2017, all of which are hereby incorporated by reference for all purposes as if fully set forth herein.

BACKGROUND

Field

The present disclosure relates to a touch display device and a touchscreen panel.

Description of Related Art

In response to the development of the information society, demand for a variety of display devices for displaying images is increasing. In this regard, a range of display devices, such as liquid crystal display (LCD) devices, plasma display panels (PDPs), and organic light-emitting diode (OLED) display devices, have recently come into widespread use.

Among such display devices, touch display devices provide touch-based user interfaces enabling users to intuitively and conveniently input data or instructions directly to devices, rather than using conventional data input systems, such as buttons, a keyboard, or a mouse.

To provide such touch-based user interfaces, touch display devices must be able to sense a touch performed by a user and accurately detect touch coordinates.

In this regard, among a variety of touch sensing methods, capacitance touch sensing is commonly used to sense a touch and determine touch coordinates using a plurality of touch electrodes disposed on a touchscreen panel, based on a change in capacitance between touch electrodes.

In a conventional touch display device, touch electrodes may have different sizes due to the shapes, locations, and the like of the touch electrodes. This may consequently cause undesired differences in capacitance formed between the touch electrodes, thereby degrading touch sensitivity.

BRIEF SUMMARY

At least one embodiment of the present disclosure provide a touch display device and a touchscreen panel that can obtain high touch sensitivity by preventing or removing undesired differences in capacitance among touch electrodes in all positions, regardless of the positions of the touch electrodes.

Also provided are a touch display device and a touchscreen panel that can perform accurate capacitance-based touch sensing, regardless of the shapes of the touchscreen panel.

Also provided are a touch display device and a touchscreen panel that can obtain high touch sensitivity by preventing undesired differences in capacitance among touch electrodes, even in the case in which the touch electrodes have different sizes.

Also provided are a touch display device and a touchscreen panel that can obtain high touch sensitivity by preventing undesired differences in capacitance among touch electrodes, even in the case in which the touch electrodes have different shapes.

Also provided are a touch display device and a touchscreen panel that can obtain high touch sensitivity in all areas by reducing undesired differences in capacitance among touch electrodes located in rounded corner areas and touch electrodes located in the other areas.

According to an aspect of the present disclosure, a touch display device may include: a touchscreen panel including a plurality of touch electrodes; and a touch circuit transferring touch driving signals to the touchscreen panel Each of the plurality of touch electrodes may be a patterned mesh-type electrode metal.

In each area of at least portions of the plurality of touch electrodes, one or more dummy metals electrically disconnected from the electrode metal may be present.

The electrode metals and the dummy metals may be located on the same layer and may be formed of the same material.

The plurality of touch electrodes may include corner touch electrodes located in a corner area of the touchscreen panel and non-corner touch electrodes located in a non-corner area of the touchscreen panel.

The corner touch electrodes may be smaller than the non-corner touch electrodes.

In each area of the non-corner touch electrodes, one or more dummy metals electrically disconnected from the electrode metal may be present.

In contrast, in each area of the corner touch electrodes, dummy metals electrically disconnected from the electrode metal may not be present.

Alternatively, in each area of the corner touch electrodes, dummy metals electrically disconnected from the electrode metal may be present at a ratio lower than a ratio of the dummy metals present in the each area of the non-corner touch electrodes.

Here, the ratio of one or more dummy metals in each area of the corner touch electrodes may mean a ratio B/A of a total area B of the one or more dummy metals with respect to a total area A of the corner touch electrodes.

The ratio of the dummy metals in the area of the corner touch electrode may be controlled by adjusting the number or area of the dummy metals in the area of the corner touch electrode.

In the touchscreen panel, one or more corner areas may have a rounded outline shape.

A peripheral portion of each of the corner touch electrodes may have a rounded shape.

A plurality of touch lines electrically connecting at least portions of the plurality of touch electrodes to the touch circuit may be disposed in the touchscreen panel.

The shapes of the touch lines electrically connected to the corner touch electrodes may be different from the shapes of the touch lines electrically connected to the non-corner touch electrodes.

A peripheral portion of each of the corner touch electrodes may be rounded. Each of the touch lines electrically connected to the corner touch electrodes may have a rounded portion.

The plurality of touch electrodes may be mutual-capacitance touch sensors.

Alternatively, the plurality of touch electrodes may be self-capacitance touch sensors.

The size of the area of a single touch electrode corresponds to the size of the areas of several subpixels.

The mesh-type electrode metal of each of the plurality of touch electrodes may have a plurality of open areas. Each of the plurality of open areas may correspond to light-emitting portions of one or more subpixels.

The patterned mesh-type electrode metal corresponding to each of the touch electrodes may be located to overlap a black matrix. That is, the black matrix is located to overlap the electrode metal.

In the patterned mesh-type electrode metal corresponding to each of the touch electrodes, the plurality of open areas may correspond to a plurality of color filters.

According to another aspect of the present disclosure, a touchscreen panel may include: a plurality of touch electrodes; and a plurality of touch lines connected to at least portions of the plurality of touch electrodes.

Each of the plurality of touch electrodes may be a patterned mesh-type electrode metal.

One or more dummy metals electrically disconnected from the electrode metal may be present in each area of at least portions among the plurality of touch electrodes.

A ratio of the dummy metals in each area of at least one touch electrode among the plurality of touch electrodes may be different from a ratio of the dummy metals in each area of the other touch electrodes.

The dummy metals may not be present in each area of at least one touch electrode among the plurality of touch electrodes.

When the at least one touch electrode is smaller than the other touch electrodes, the ratio of the dummy metals in each area of the at least one touch electrode may be lower than the ratio of the dummy metals in each area of the other touch electrodes.

When the at least one touch electrode is located in a corner area, the ratio of the dummy metals in each area of the at least one touch electrode may be lower than the ratio of the dummy metals in each area of the other touch electrodes.

When a peripheral portion of the at least one touch electrode has a rounded shape, the ratio of the dummy metals in each area of the at least one touch electrode may be lower than the ratio of the dummy metals in each area of the other touch electrodes.

According to at least one embodiment, the touch display device and the touchscreen panel can obtain high touch sensitivity by preventing or removing undesired differences in capacitance formed among touch electrodes located in all positions, regardless of the positions of the touch electrodes.

In addition, according to the present disclosure, the touch display device and the touchscreen panel can perform accurate capacitance-based touch sensing, regardless of the shapes of the touchscreen panel.

Furthermore, according to at least one embodiment, the touch display device and the touchscreen panel can obtain high touch sensitivity by preventing undesired differences in capacitance among touch electrodes, even in the case in which the touch electrodes have different sizes.

In addition, according to at least one embodiment, the touch display device and the touchscreen panel can obtain high touch sensitivity by preventing undesired differences in capacitance among touch electrodes, even in the case in which the touch electrodes have different shapes.

Furthermore, according to at least one embodiment, the touch display device and the touchscreen panel can obtain high touch sensitivity in all areas by reducing undesired differences in capacitance between touch electrodes located in rounded corner areas and touch electrodes located in the other areas.

In at least one embodiment, a touch display device comprises a plurality of touch electrodes. A first touch electrode of the plurality of touch electrodes occupies a first area and comprises first mesh-shaped electrode metal. First dummy metal is in a same layer as the first mesh-shaped electrode metal and is in the first area occupied by the first touch electrode, the first dummy metal being electrically disconnected from the first mesh-shaped electrode metal.

In at least one embodiment, a second touch electrode of the plurality of touch electrodes occupies a second area and comprises second mesh-shaped electrode metal, and the touch display device either: (a) further comprises second dummy metal in a same layer as the second mesh-shaped electrode metal and in the second area occupied by the second touch electrode, the second dummy metal being electrically disconnected from the second mesh-shaped electrode metal, a second ratio of the second dummy metal to the second area of the second touch electrode being lower than a first ratio of the first dummy metal to the first area of the first touch electrode, or (b) does not include any dummy metal in the same layer as the second mesh-shaped electrode metal in the second area occupied by the second touch electrode.

In at least one embodiment, the second touch electrode is a corner electrode in a corner region of a touchscreen panel and the first touch electrode is a non-corner electrode in a non-corner region of the touchscreen panel. In at least one embodiment, the corner electrode has a rounded edge.

In at least one embodiment, the second touch electrode is an edge electrode at an edge region of a touchscreen panel and the first touch electrode is an inner electrode in an inner region of the touchscreen panel.

In at least one embodiment, the first area occupied by the first touch electrode has a different size than the second area occupied by the second touch electrode. In at least one embodiment, the second area occupied by the second touch electrode is smaller than the first area occupied by the first touch electrode.

In at least one embodiment, a third touch electrode of the plurality of touch electrodes occupies a third area and comprises third mesh-shaped electrode metal, the third area being smaller than the second area, and touch display device either: (a) further comprises third dummy metal in a same layer as the third mesh-shaped electrode metal and in the third area occupied by the third touch electrode, the third dummy metal being electrically disconnected from the third mesh-shaped electrode metal, a third ratio of the third dummy metal to the third area of the third touch electrode being lower than the second ratio of the second dummy metal to the second area of the second touch electrode, or (b) does not include any dummy metal in the same layer as the third mesh-shaped electrode metal in the third area occupied by the third touch electrode.

In at least one embodiment, the first mesh shaped electrode metal has a plurality of open areas, each of the plurality of open areas corresponding to light-emitting portions of one or more subpixels.

In at least one embodiment, a black matrix overlaps the first mesh shaped electrode metal, and wherein the plurality of open areas correspond to a plurality of color filters.

In at least one embodiment, the first mesh shaped electrode metal surrounds the first dummy metal in a plan view of the touch display device.

In at least one embodiment, the touch display device further comprises a cathode layer; and an encapsulation layer on the cathode layer, wherein the plurality of touch electrodes are on the encapsulation layer. In at least one embodiment, the plurality of touch electrodes are in a touch electrode area, and at least one of the encapsulation layer and the cathode layer is larger than the touch electrode area.

In at least one embodiment, a plurality of touch lines electrically connect to the plurality of touch electrodes. A corner shape of a first touch line electrically connected to the first touch electrode is different than a corner shape of a second touch line electrically connected to a second touch electrode of the plurality of touch electrodes. In one embodiment, the second touch line has a portion with a rounded corner shape.

In one embodiment, a plurality of touch lines electrically connect to the plurality of touch electrodes. A corner shape of a first touch line electrically connected to the first touch electrode is different than a corner shape of a second touch line electrically connected to a second touch electrode of the plurality of touch electrodes. In one embodiment, the second touch line has a portion with a rounded corner shape In at least one embodiment, a touch display device comprises a plurality of touch electrodes. The plurality of touch electrodes comprise a first pair of immediately adjacent touch electrodes separated by a first distance, and a second pair of immediately adjacent touch electrodes separated by a second distance that is greater than the first distance. The first pair of adjacent touch electrodes occupy a smaller area than the second pair of adjacent touch electrodes.

In at least one embodiment, the first pair of immediately adjacent touch electrodes is in a corner region of a touchscreen panel and the second pair of immediately adjacent touch electrodes is in a non-corner region of the touchscreen panel.

In at least one embodiment, a corner shape of a first touch line electrically connected to a touch electrode of the first pair of immediately adjacent touch electrodes is different than a corner shape of a second touch line electrically connected to a touch electrode of the second pair of immediately adjacent touch electrodes. In at least one embodiment, the second touch line has a portion with a rounded corner shape.

In at least one embodiment, the display device further comprises a cathode layer and an encapsulation layer on the cathode layer. The plurality of touch electrodes are on the encapsulation layer.

In at least one embodiment, a touch display device comprises a plurality of touch electrodes including a first pair of immediately adjacent touch electrodes made of a first electrode metal patterned as a mesh type, and a second pair of immediately adjacent touch electrodes made of a second electrode metal patterned as a mesh type. An open area size of the first electrode metal is larger than an open area size of the second electrode metal. The first pair of adjacent touch electrodes occupy a larger area than the second pair of adjacent touch electrodes.

In at least one embodiment, the first pair of immediately adjacent touch electrodes is in a non-corner region of a touchscreen panel and the second pair of immediately adjacent touch electrodes is in a corner region of the touchscreen panel.

In at least one embodiment, a corner shape of a first touch line electrically connected to a touch electrode of the first pair of immediately adjacent touch electrodes is different than a corner shape of a second touch line electrically connected to a touch electrode of the second pair of immediately adjacent touch electrodes.

In at least one embodiment, the second touch line has a portion with a rounded corner shape.

BRIEF DESCRIPTION OF THE DRAWINGS

The above and other objects, features and advantages of the present disclosure will be more clearly understood from the following detailed description when taken in conjunction with the accompanying drawings, in which:

FIG. 6 illustrates three areas of the touchscreen panel according to exemplary embodiments;

DETAILED DESCRIPTION

Figure 1:
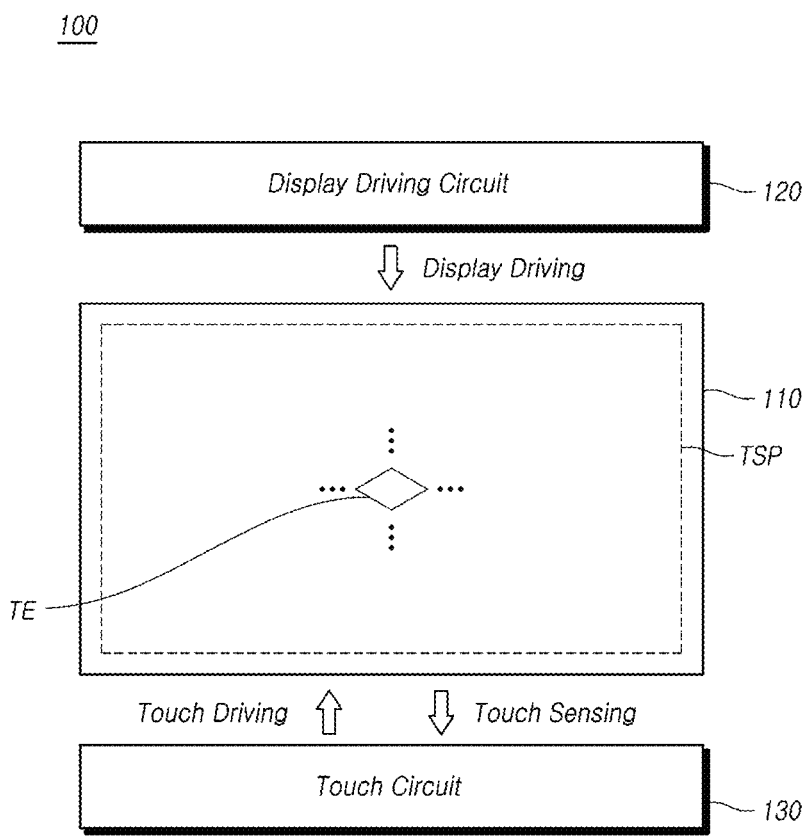
FIG. 1 is a schematic view illustrating the system configuration of a touch display device according to exemplary embodiments.

Hereinafter, reference will be made to embodiments of the present disclosure in detail, examples of which are illustrated in the accompanying drawings. Throughout this document, reference should be made to the drawings, in which the same reference numerals and symbols will be used to designate the same or like components. In the following description of the present disclosure, detailed descriptions of known functions and components incorporated herein will be omitted in the case that the subject matter of the present disclosure may be rendered unclear thereby.

It will also be understood that, while terms such as "first," "second," "A," "B," "(a)," and "(b)" may be used herein to describe various elements, such terms are merely used to distinguish one element from another element. The substance, sequence, order, or number of these elements is not limited by these terms. It will be understood that when an element is referred to as being "connected to" or "coupled to" another element, not only can it be "directly connected or coupled to" the other element, but it can also be "indirectly connected or coupled to" the other element via an "intervening" element. In the same context, it will be understood that when an element is referred to as being formed "on" or "under" another element, not only can it be directly formed on or under another element, but it can also be indirectly formed on or under another element via an intervening element.

FIG. 1 is a schematic view illustrating the system configuration of a touch display device 100 according to exemplary embodiments.

Referring to FIG. 1, the touch display device 100 according to exemplary embodiments can provide an image display function to display images and a touch sensing function to sense a touch performed by a user.

The touch display device 100 according to exemplary embodiments includes a display panel 110 on which data lines and gate lines are disposed, a display driver circuit 120 driving the display panel 110, and the like to display images.

In terms of functions, the display driver circuit 120 includes a data driver circuit driving the data lines, a gate driver circuit driving the gate lines, a controller controlling the data driver circuit and the gate driver circuit, and the like.

The display driver circuit 120 may be implemented as one or more integrated circuits (ICs).

The touch display device 100 according to exemplary embodiments includes a touchscreen panel TSP on which a number of touch electrodes TE, are disposed, a touch circuit 130 driving the touchscreen panel TSP and performing sensing processing, and the like, to perform a touch sensing operation. The touchscreen panel TSP may be integrated into the display panel 110 such that the touchscreen panel TSP and the display panel TSP together form an integrated touchscreen display panel.

The touch circuit 130 transfers touch driving signals to the touchscreen panel TSP to drive the touchscreen panel TSP, subsequently receives touch sensing signals from the touchscreen panel TSP, and detects a touch and/or touch coordinates based on the touch sensing signals.

The touch circuit 130 may include a touch driver circuit transferring touch driving signals and receiving touch sensing signals, a touch controller calculating a touch and/or a touched position (touch coordinates), and the like.

The touch circuit 130 may be embodied as one or more components (e.g. ICs) or may be configured separately to the display driver circuit 120.

In addition, at least a portion of the touch circuit 130 may be integrated with the display driver circuit 120 or an internal circuit of the display driver circuit 120. For example, the touch driver circuit of the touch circuit 130 may be embodied as an IC, together with the data driver circuit of the display driver circuit 120.

The touch display device 100 according to exemplary embodiments can sense a touch based on capacitance formed in the touch electrodes TE.

The touch display device 100 according to exemplary embodiments can sense a touch using a capacitance-based touch sensing method, i.e. mutual-capacitance-based touch sensing or self-capacitance-based touch sensing.

In the case of mutual-capacitance-based touch sensing, a plurality of touch electrodes TE may be divided into driving electrodes (also referred to as transmitting electrodes or driving lines) to which touch driving signals are applied and sensing electrodes (also referred to as receiving electrodes or sensing lines) in which touch sensing signals are sensed, the sensing electrodes forming capacitance together with the driving electrodes.

Hereinafter, touch electrodes among the plurality of touch electrodes, corresponding to the driving electrodes, will be referred to as "first touch electrodes TE-1," while touch electrodes among the plurality of touch electrodes, corresponding to the sensing electrodes, will be referred to as "second touch electrodes TE-2."

The mutual-capacitance-based touch sensing as described above detects a touch and/or touch coordinates based on a change in capacitance (mutual capacitance) between a driving electrode and a sensing electrode depending on the presence of a pointer, such as a finger, a stylus, or similar.

In the case of self-capacitance-based touch sensing, each touch electrode TE functions not only as a driving electrode but also as a sensing electrode. Specifically, a touch driving signal is applied to each touch electrode TE, and a touch sensing signal is received through the touch electrode TE, to which the touch driving signal is applied. Thus, in the self-capacitance-based touch sensing, there are no distinction between driving electrodes and sensing electrodes.

The self-capacitance-based touch sensing detects a touch and/or touch coordinates based on a change in capacitance between a pointer, such as a finger or a stylus, and a touch electrode TE.

As described above, the touch display device 100 according to exemplary embodiments can sense a touch using the mutual-capacitance-based touch sensing or the self-capacitance-based touch sensing.

Although improvements in the structure for improving touch sensitivity will be described hereinafter, for convenience of description, in relation to the touch display device 100 and the touchscreen panel TSP in which mutual-capacitance-based touch sensing is used, such improvements in the structure and the like, for improving touch sensitivity, are applicable equally to the touch display device and the touchscreen panel in which self-capacitance-based touch sensing is used.

In addition, the display panel 110 of the touch display device 100 according to exemplary embodiments may be selected from various types of panels, such as an organic light-emitting diode (OLED) panel and a liquid crystal display (LCD) panel. Hereinafter, the OLED panel will be taken by way of example for convenience of description.

Figure 2:
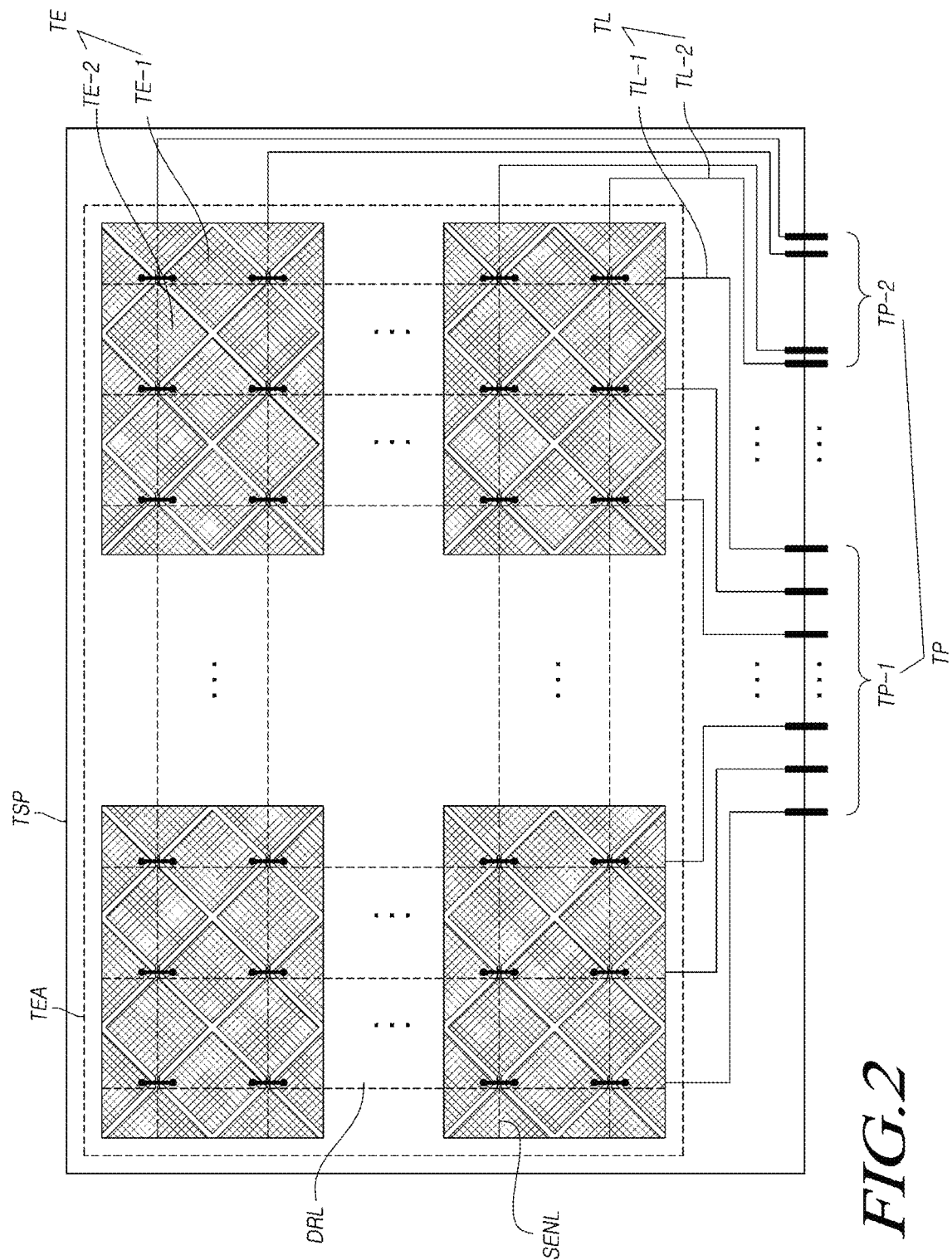
FIG. 2 illustrates an exemplary touchscreen panel of the touch display device according to exemplary embodiments.

FIG. 2 illustrates an exemplary touchscreen panel TSP of the touch display device 100 according to exemplary embodiments.

Referring to FIG. 2, the touchscreen panel TSP has a plurality of touch electrodes TE disposed thereon. Touch lines TL electrically connecting the touch electrodes TE and the touch circuit 130 are disposed on the touchscreen panel TSP.

In addition, the touchscreen panel TSP has touch pads TP that are in contact with the touch circuit 130 to electrically connect the touch lines TL and the touch circuit 130.

The touch electrodes TE and the touch lines TL may be present on the same layer or different layers.

The touch pads TP may be portions of the touch lines TL or may be metals in contact with the touch lines TL.

Hereinafter, an area of the touchscreen panel TSP in which the touch electrodes TE are disposed will be referred to as a touch electrode area TEA.

The touch electrode area TEA itself may be referred to as a touchscreen panel TSP. Although not shown in FIG. 2, the cathode layer or encapsulation layer of FIGS. 17 and 18 can be larger than the touch electrode area TEA and extends past the touch electrode area TEA on all sides.

When the touch display device 100 uses the mutual-capacitance-based touch sensing, two or more first touch electrodes TE-1 arranged in the same column (or the same row) may be electrically connected to form a single driving electrode line DRL. Two or more second touch electrodes TE-2 arranged in the same column (or the same row) may be electrically connected to form a single sensing line SENL.

The two or more first touch electrodes TE-1 forming a single driving line DRL correspond to driving electrodes. The two or more second touch electrodes TE-2 forming a single electrode line SENL correspond to sensing electrodes.

One or more touch lines TL are connected to each driving line DRL, and one or more touch line TL is connected to each sensing line SENL.

One or more touch line TL connected to each driving electrode line DRL are referred to as driving touch lines TL-1. One or more touch line TL connected to each sensing electrode line SENL are referred to as sensing touch lines TL-2.

A single touch pad TP is connected to each touch line. A touch pad TP connected to each driving touch line TL-1 is referred to as a driving touch pad TP-1. A touch pad TP connected to each sensing touch line TL-2 is referred to as a sensing touch pad TP-2.

In other words, two or more touch electrodes among the plurality of touch electrodes TE are electrically connected.

Thus, the number of touch electrodes TE may be comprised of driving electrode lines DRL and sensing electrode lines SENL.

Each of the driving electrode lines DRL is comprised of two or more touch electrodes TE that are arranged in the same column or row and are electrically connected.

Two or more touch electrodes TE forming a single driving electrode line DRL may be integrated or may be connected by a connecting pattern, such as a bridge.

Each of the sensing electrode lines SENL is comprised of two or more touch electrodes TE that are arranged in the same column or row and are electrically connected.

Two or more second touch electrodes TE-2 forming a single sensing electrode line SENL may be integrated or may be connected by a connecting pattern, such as a bridge pattern (BP).

The two or more first touch electrodes TE-1 forming a single driving electrode line DRL act as driving electrodes to which touch driving signals are applied, while the two or more second touch electrodes TE-2 forming a single sensing electrode line SENL act as sensing electrodes in which touch sensing signals are sensed.

Portions of the plurality of touch electrodes TE are electrically connected to the touch lines TL, while the remaining portions of the plurality of touch electrodes TE are not electrically connected to the touch lines TL.

For example, one of the first touch electrodes TE-1 (e.g. one or two outermost first touch electrodes), corresponding to driving electrodes forming a single driving electrode line DRL, is connected to the corresponding driving touch line TL-1, while the remaining first touch electrodes TE-1 are not connected to the driving touch line TL-1.

In addition, one of the second touch electrodes TE-2 (e.g. one or two outermost second touch electrodes), corresponding to sensing electrodes forming a single sensing electrode line SENL, is connected to the corresponding sensing touch line TL-2, while the remaining second touch electrodes TE-2 are not connected to the sensing touch line TL-2.

Due to the above-described structure, the touchscreen panel TSP can perform mutual-capacitance-based touch sensing.

Referring to FIG. 2, each of the plurality of touch electrodes TE, may have, for example, a diamond-like shape.

Alternatively, each of the plurality touch electrodes TE may have a rectangular shape (including a square shape), and a variety of other shapes are possible.

The touch electrodes TE, may be designed to have a variety of shapes, considering the display performance and touch performance of the touch display device 100.

The touchscreen panel TSP, according to exemplary embodiments, may be disposed outside of the display panel 110 (i.e. an external touchscreen panel) or may be disposed inside of the display panel 110 (i.e. an internal touchscreen panel).

When the touchscreen panel TSP is an external touchscreen panel, the touchscreen panel TSP and the display panel 110 may be fabricated in different panel fabrication processes before being bonded to each other.

When the touchscreen panel TSP is an internal touchscreen panel, the touchscreen panel TSP and the display panel 110 may be fabricated together in a single panel fabrication process.

When the touchscreen panel TSP is an internal touchscreen panel, the touchscreen panel TSP may be regarded as an assembly of a plurality of touch electrodes TE. Here, a plate on which the plurality of touch electrodes TE are placed may be a dedicated substrate or may be a layer (e.g. an encapsulation layer) present on the display panel 110.

Figure 3:
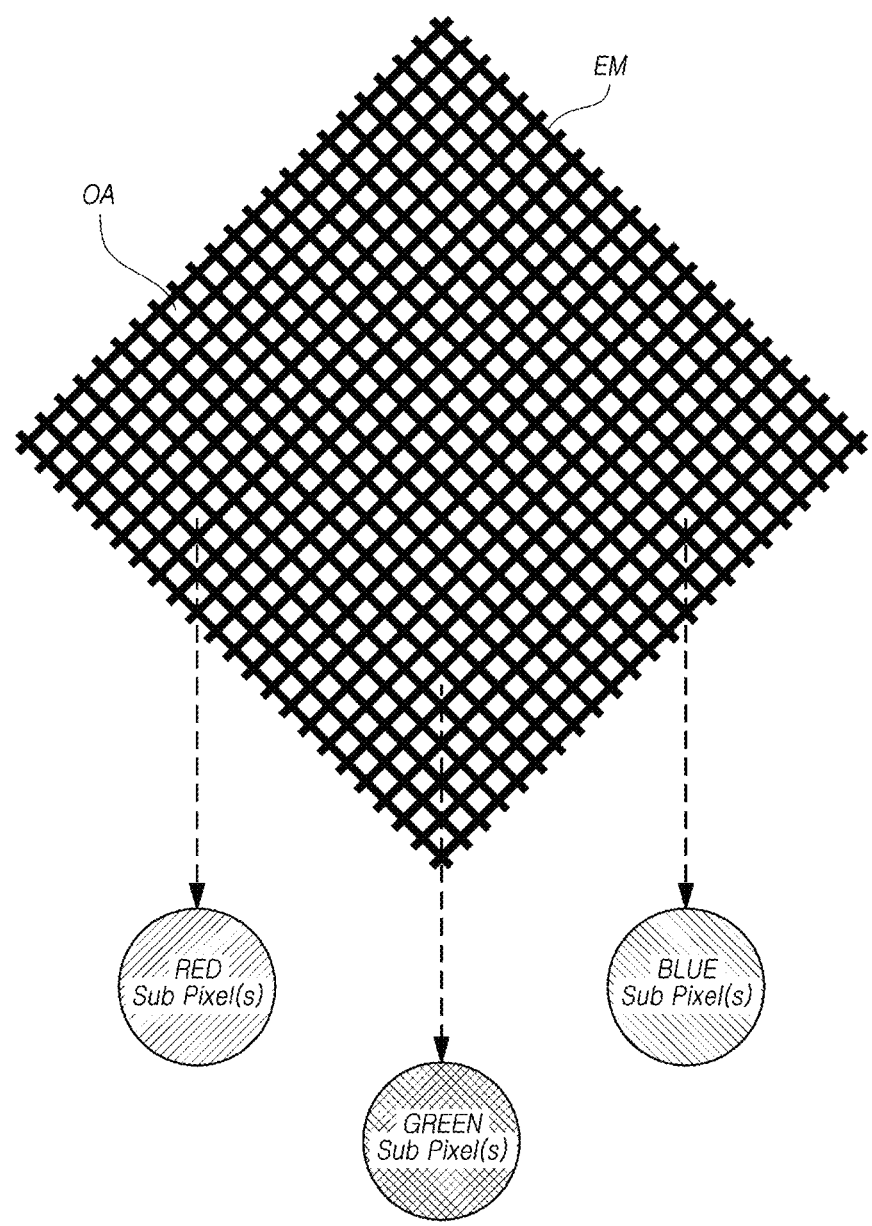
FIG. 3 illustrates a plan view of a mesh-type touch electrode in the touchscreen panel according to exemplary embodiments.

FIG. 3 illustrates a mesh-type touch electrode in the touchscreen panel TSP according to exemplary embodiments.

In the touchscreen panel TSP according to exemplary embodiments, each of the plurality of touch electrodes TE may be a mesh-type touch electrode.

That is, each touch electrode TE, may be a mesh-type electrode metal EM in which openings are formed.

The openings in the touch electrode TE are referred to as open areas OA.

The electrode metal EM used herein may be interpreted as having the same meaning as the touch electrode TE.

As described above, the outline shape of each touch electrode TE may be roughly a diamond-like shape, a rectangular shape (including a square shape), or similar. The touch electrode TE occupies a certain overall area defined by the shape of the touch electrode TE. In addition, the open areas OA corresponding to the openings in each touch electrode TE may have a diamond-like shape, a rectangular shape (including a square shape), or similar.

The rough outline shape of each touch electrode TE may be the same or differ from the shape of the open areas OA corresponding to the openings in the touch electrode TE.

Each touch electrode TE is a mesh-type electrode metal EM having a plurality of open areas OA. The touch electrode TE, is patterned such that light-emitting portions of one or more subpixels are located in each of the plurality of open areas OA. Thus, a touch sensing structure and the display panel 100 can be effectively provided, and the luminous efficiency of the display panel 110 with the touchscreen panel TSP being internally disposed therein can be improved.

When the display panel 110 is an LCD panel, the light-emitting portion of the subpixel may include a pixel electrode, a color filter, or similar. When the display panel 110 is an OLED panel, the light-emitting portion of the subpixel may include a pixel electrode, a color filter, or similar. When the display panel 110 is an OLED panel, the light-emitting portion of the subpixel may include an anode, an organic light-emitting layer, or similar of an OLED, and in some cases, a color filter or similar.

As described above, the open areas OA of the electrode metal EM corresponding to the touch electrode TE are provided according to light-emitting positions, thereby improving the luminous efficiency of the display panel 110.

To further improve the luminous efficiency of the display panel 110, a circuit portion (i.e. a portion in which a transistor or similar is disposed) of each subpixel may be located to overlap the electrode metal EM instead of overlapping any of the open areas OA.

The subpixels may be comprised of red (R), green (G), and blue (B) subpixels.

In some cases, the subpixels may be comprised of red (R), white (W), green (G), and blue (B) subpixels.

Figure 4:
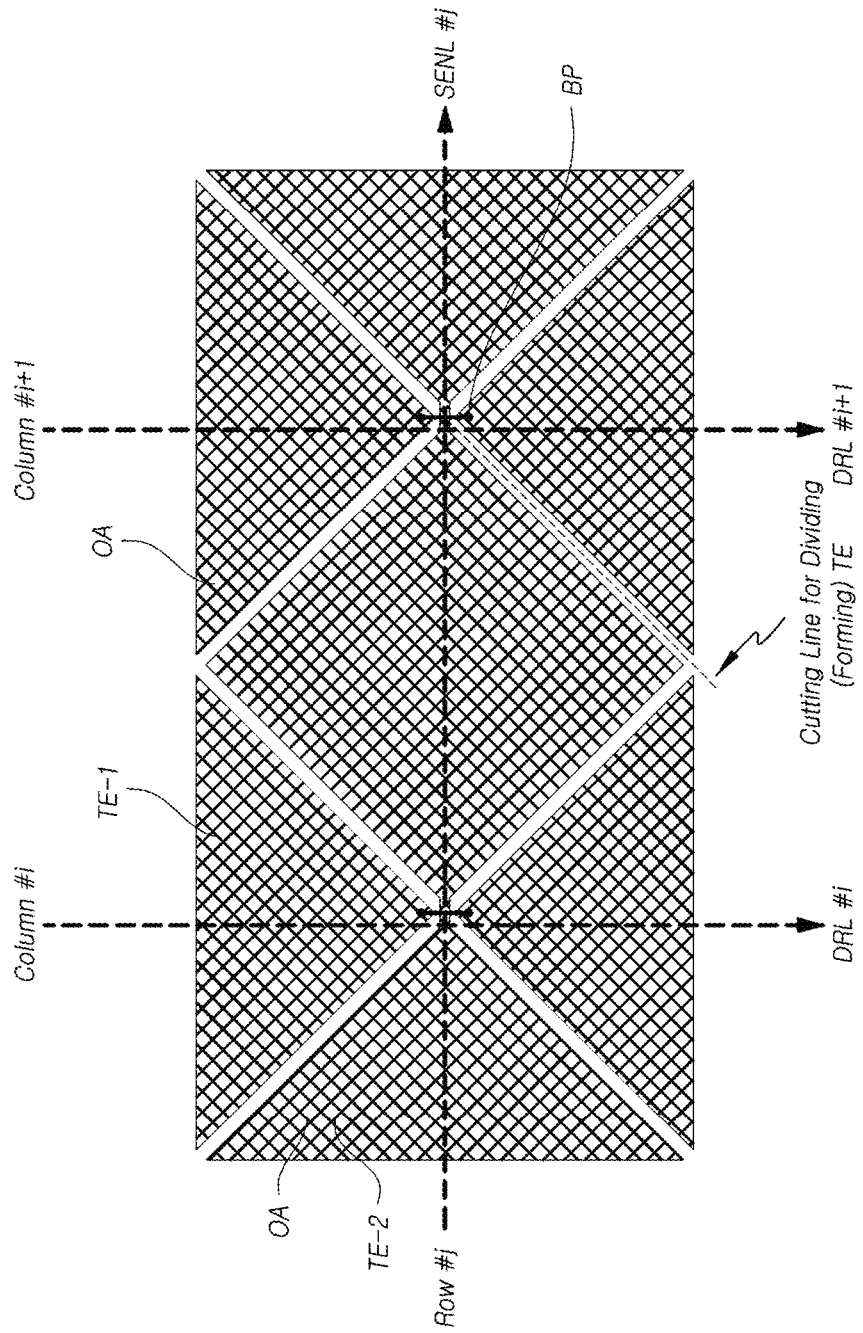
FIG. 4 illustrates a portion of the touchscreen panel according to exemplary embodiments.

FIG. 4 illustrates a portion of the touchscreen panel TSP according to exemplary embodiments.

FIG. 4 illustrates seven touch electrodes TE, each of which is embodied as a mesh-type electrode metal EM having open areas OA, as illustrated in FIG. 3.

The seven touch electrodes TE, include four first touch electrodes TE-1 corresponding to driving electrodes and three second touch electrodes TE-2 corresponding to sensing electrodes.

Among the four first touch electrodes TE-1, two first touch electrodes TE-1 arranged in the $i^{th}$ column form the $i^{th}$ driving electrode line DRL #i.

In an example, two first touch electrodes TE-1 arranged in the $i^{th}$ column may be electrically connected by a bridge pattern BP located on a different layer.

In another example, the two first touch electrodes TE-1 arranged in the $i^{th}$ column may be formed integrally with each other, such that the two first touch electrodes TE-1 are electrically connected.

Among the four first touch electrodes TE-1, two first touch electrodes TE-1 arranged in the $(i+1)^{th}$ column form the $(i+1)^{th}$ driving electrode line DRL #i+1.

In an example, two first touch electrodes TE-1 arranged in the $(i+1)^{th}$ column may be electrically connected by a bridge pattern BP located on a different layer.

In another example, the two first touch electrodes TE-1 arranged in the $(i+1)^{th}$ column may be formed integrally with each other, such that the two first touch electrodes TE-1 are electrically connected.

The three second touch electrodes TE-2 are arranged in the $j^{th}$ row to form the $j^{th}$ sensing electrode line SENL #j.

In an example, the three second touch electrodes TE-2 arranged in the $j^{th}$ row may be formed integrally with each other, such that the three second touch electrodes TE-2 are electrically connected.

In another example, the three second touch electrodes TE-2 arranged in the $j^{th}$ row may be electrically connected by a bridge pattern BP located on a different layer.

Referring to FIG. 4, all of the touch electrodes TE, including the four first touch electrodes TE-1 and the three second touch electrodes TE-2, can be manufactured by manufacturing an electrode metal EM having a wide area and then cutting the electrode metal EM in a predetermined pattern so that the first and second touch electrodes are electrically separated.

Figure 5A:
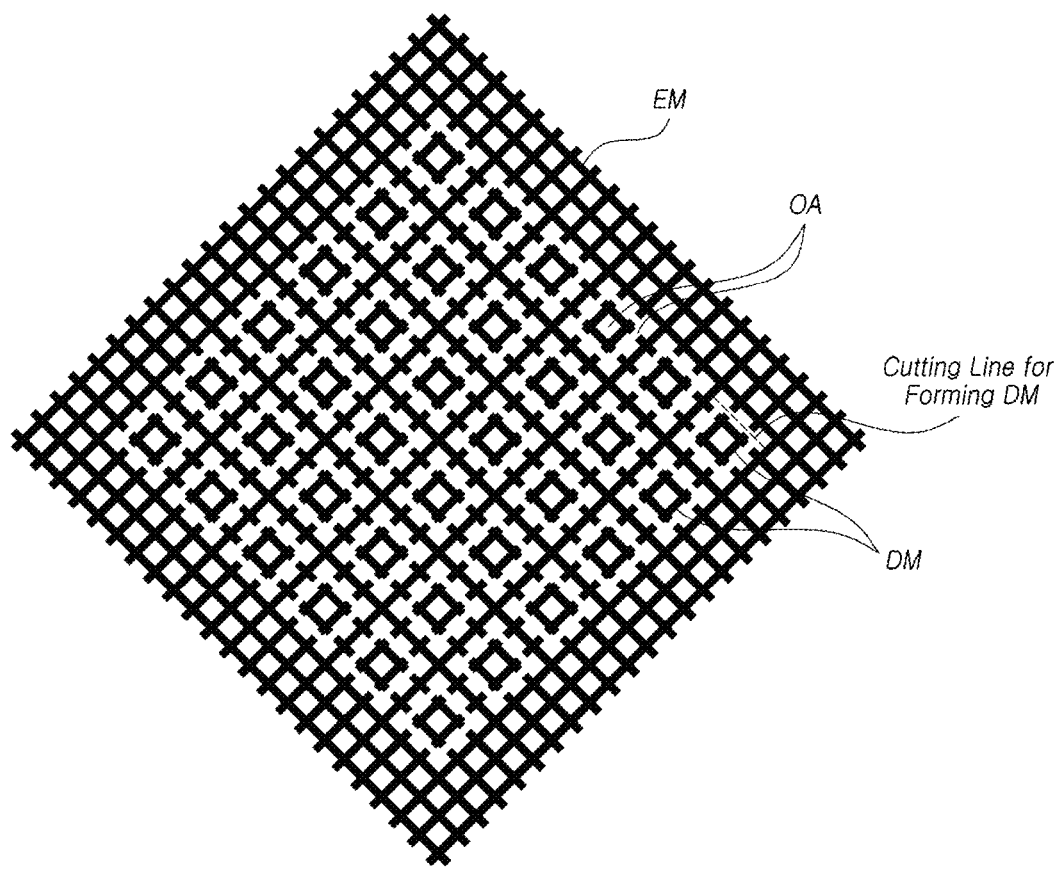
FIG. 5A illustrates a plan view of a mesh-type touch electrode in the touchscreen panel according to exemplary embodiments, with dummy metals being present in the area of the mesh-type touch electrode.
Figure 5B:
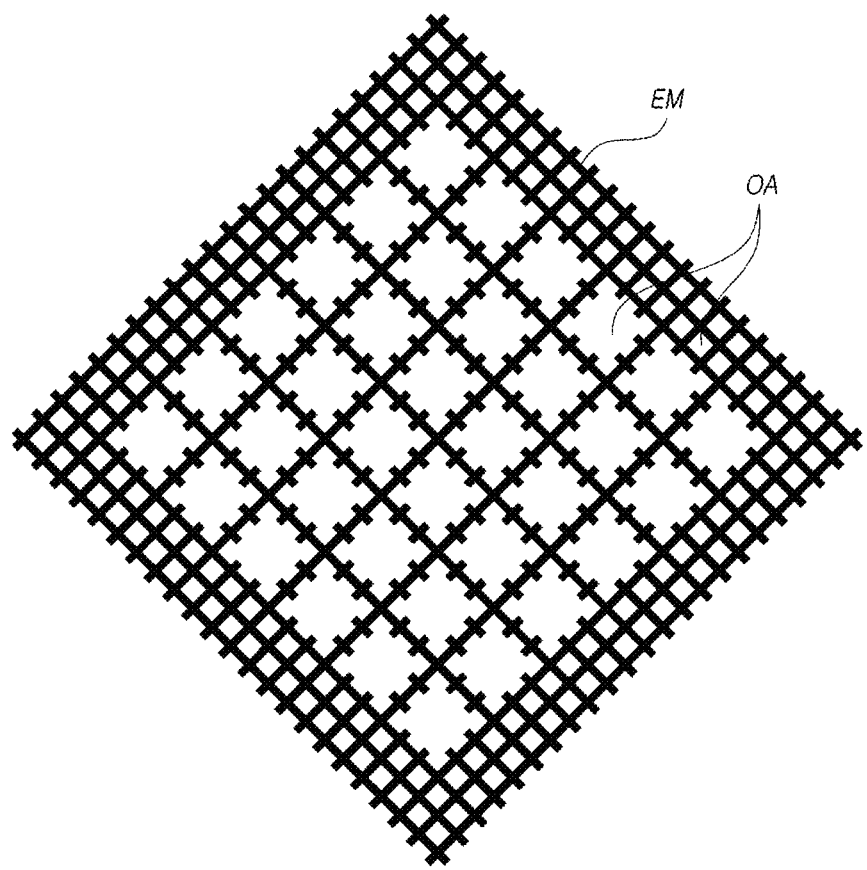
FIG. 5B illustrates the mesh-type touch electrode in the touchscreen panel according to exemplary embodiments, in which dummy metals present in the area of the mesh-type touch electrode are not illustrated.

FIG. 5A illustrates a mesh-type touch electrode in the touchscreen panel according to exemplary embodiments, with dummy metals being present in the area of the mesh-type touch electrode, while FIG. 5B illustrates the mesh-type touch electrode in the touchscreen panel according to exemplary embodiments, in which dummy metals present in the area of the mesh-type touch electrode are not illustrated.

Referring to FIG. 5A, each of a plurality of touch electrodes disposed on the touchscreen panel TSP is embodied as a patterned mesh-type electrode metal EM.

That is, the patterned mesh-type electrode metal EM may be referred to as a touch electrode TE.

Since a single touch electrode TE is a patterned mesh-type electrode metal EM, a plurality of openings are present in the area of the single touch electrode TE. Here, a plurality of openings present in the area of the touch electrode TE are referred to as open areas OA.

At least portions of the plurality of touch electrodes TE, disposed on the touchscreen panel TSP have one or more dummy metals DM in at least a portion of the area thereof, the dummy metals DM being electrically disconnected from the electrode metal EM. The dummy metals DM are in a same metal layer as the electrode metal EM. The dummy metals DM are surrounded on all sides by the electrode metal EM in a plan view of the touchscreen panel.

Here, the electrode metal EM can be a portion of the touch electrode TE to which touch driving signals are applied or in which touch sensing signals are sensed. In contrast, although the dummy metals DM are present in the area of the touch electrode TE, no touch driving signals are applied to and no touch sensing signals are sensed in the dummy metals. The dummy metals may be electrically floated, and are also be referred to as a floating pattern.

Although the electrode metal EM can be electrically connected to the touch circuit 130, the dummy metals DM are not electrically connected to the touch circuit 130.

As described above, one or more dummy metals DM can be present in each area of all of the touch electrodes TE, the dummy metals DM being disconnected from the corresponding electrode metal EM.

Alternatively, one or more dummy metals DM may be located in each area of portions of the touch electrodes TE, disconnected from the corresponding electrode metal EM. That is, the dummy metals DM may not be present in each area of portions of the touch electrodes TE. For example, the dummy metals DM may not be present in each area of corner touch electrodes located in a corner area of the touch screen panel. As another example, the dummy metals DM may not be present in each area of edge or inner touch electrodes located in a corner area or inner area of the touch screen panel.

Regarding the functions of the dummy metals DM, when only the mesh-type electrode metal EM is present but one or more dummy metals DM are not present in the area of a single touch electrode TE, a visibility problem in which the outline of the electrode metal EM is visually discernable on the screen may occur.

In contrast, when one or more dummy metals DM are present in the area of a single touch electrode TE, the visibility problem in which the outline of the electrode metal EM is visually discernable on the screen can be prevented.

In addition, the magnitude of capacitance of each touch electrode TE is controllable by adjusting the presence or absence of the dummy metals DM or the number of the dummy metals (i.e. the ratio of the dummy metals) in each touch electrode TE, so that touch sensitivity can be improved.

Referring to FIG. 5A, after an electrode metal EM of a single touch electrode TE is manufactured, dummy metals DM disconnected from the electrode metal EM can be manufactured by cutting the electrode metal EM in a predetermined pattern.

FIG. 5B illustrates the electrode metal EM acting as an actual electrode, produced by removing the dummy metals from the touch electrode TE illustrated in FIG. 5A. The expression "the electrode metal EM acting as an actual electrode" means that touch driving signals are applied to or touch sensing signals are sensed in the electrode metal EM.

Referring to FIG. 5B, the peripheral portions of the electrode metal EM are finely patterned, while the inner portions of the electrode metal EM are loosely patterned, due to the spaces from which the dummy metals DM are removed.

Hereinafter, when the touch electrode TE is illustrated, the mesh-type electrode metal EM, actually functioning as the electrode, may only be illustrated by omitting the dummy metals EM from the touch electrode TE.

FIG. 6 illustrates three areas of the touchscreen panel TSP according to exemplary embodiments.

In the touchscreen panel TSP according to exemplary embodiments, a touch electrode area TEA, in which the touch electrodes TE are disposed, includes corner areas, edge areas, and an inner area.

As illustrated in FIG. 6, in the touchscreen panel TSP, the touch electrode area TEA may be a quadrangular area comprised of four corner areas and four edge areas. In some cases, the touch electrode area TEA may be a triangular area comprised of three corner areas and three edge areas. The touch electrode area can be generalized as a polygonal area having N number of corner areas and N number of edge areas (where N is a natural number equal to or greater than 3).

In some cases, in the touchscreen panel TSP, the touch electrode area TEA may be circular. In this case, the edge areas can be regarded as corner areas.

In the following, for convenience of description, the touch electrode area TEA of the touchscreen panel TSP will be described as a quadrangular area having four corner areas and four edge areas by way of example.

The outline of the corner areas of the touchscreen panel TSP, located in the periphery of the touchscreen panel TSP, or the outline of the corner areas of the touch electrode area TEA of the touchscreen panel TSP, located in the periphery of the touchscreen panel TSP, may be right angled.

Alternatively, the outline of the corner areas of the touchscreen panel TSP, located in the periphery of the touchscreen panel TSP, or the outline of the corner areas of the touch electrode area TEA of the touchscreen panel TSP, located in the periphery of the touchscreen panel TSP, may be rounded. In one embodiment, a shape may be rounded if it has a curved shape.

In this case, the touchscreen panel TSP suitable for the touch display device 100 having rounded corners may be provided.

Figure 7:
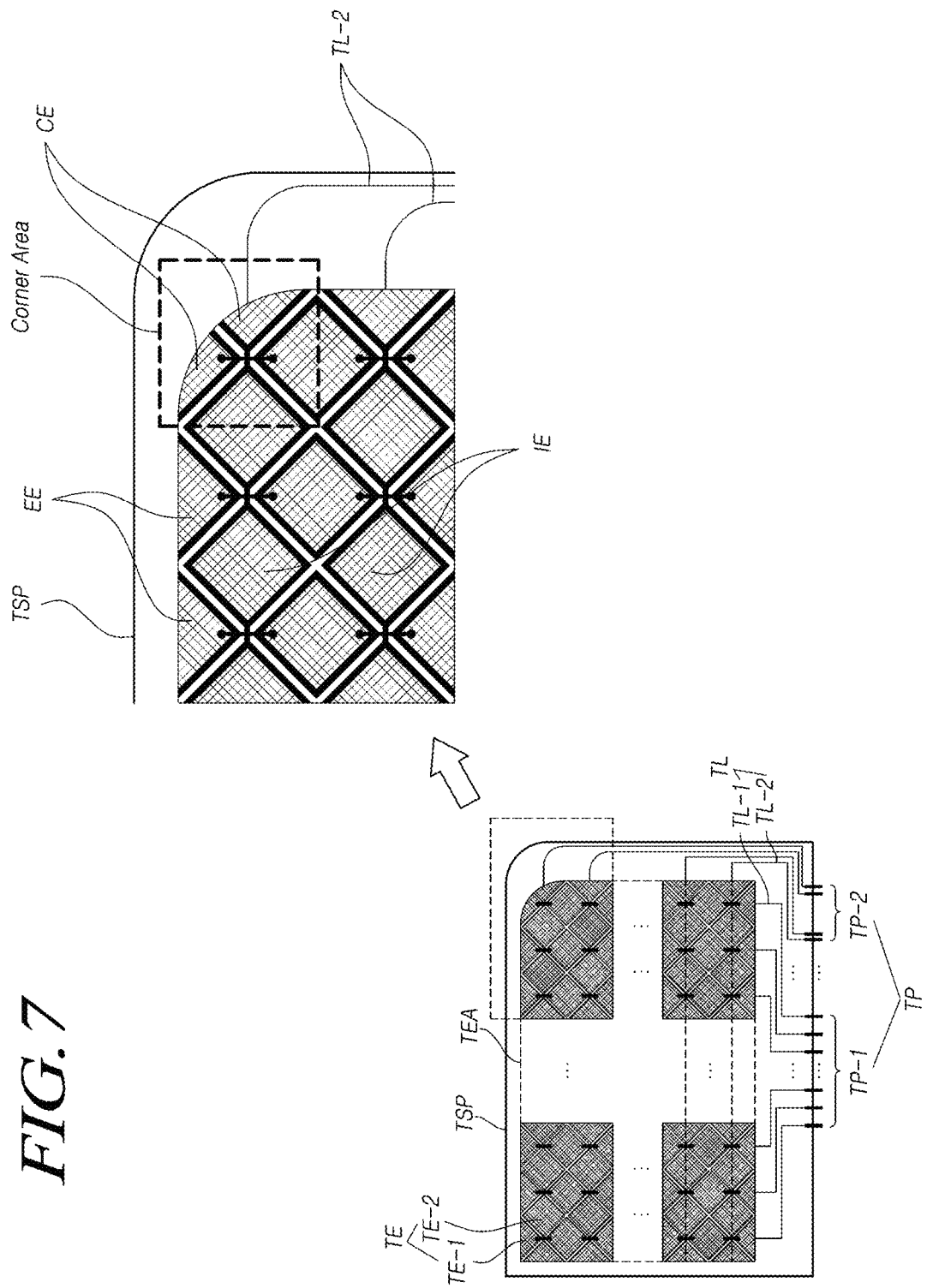
FIG. 7 illustrates touch electrodes in three areas of the touchscreen panel according to exemplary embodiments.

FIG. 7 illustrates touch electrodes TE in three areas (i.e. corner, edge, and inner areas) of the touchscreen panel TSP according to exemplary embodiments.

Referring to FIG. 7, the plurality of touch electrodes TE are respectively embodied as a mesh-type electrode metal EM.

The plurality of touch electrodes TE include corner touch electrodes CE located in the corner areas of the touchscreen panel TSP and non-corner touch electrodes located in non-corner areas (i.e. the inner area and the edge areas) of the touchscreen panel TSP.

The sizes of the corner touch electrodes CE may be smaller than the sizes of the non-corner touch electrodes.

The non-corner electrodes of the plurality of touch electrodes TE include edge touch electrodes EE and inner touch electrodes IE as non-corner touch electrodes, the edge touch electrodes EE being located in the edge areas of the touchscreen panel TSP, and the inner touch electrodes IE being located in the inner area of the touchscreen panel TSP, inside of the edge areas and the corner areas.

The inner touch electrodes IE have a diamond-like or rectangular shape.

Although the edge touch electrodes EE have a diamond-like or rectangular shape, the shape of the edge touch electrodes EE may correspond to the half of the shape of the inner touch electrodes IE.

The corner touch electrodes CE may be smaller than the half of the shape of the inner touch electrodes IE.

The sizes of the edge touch electrodes EE are greater than the sizes of the corner touch electrodes CE.

The sizes of the edge touch electrodes EE are equal to or smaller than the sizes of the inner touch electrodes IE.

The size relationship among the corner touch electrodes CE, the edge touch electrodes EE, and the inner touch electrodes IE can still apply regardless of whether or not the corner areas are rounded.

When the outer portion (i.e. peripheral portion) of the corner areas located in the periphery of the touchscreen panel TSP has a rounded shape as illustrated in FIG. 7, the peripheral portion of the corner touch electrodes CE is rounded, and at least portions of the touch lines (e.g. TL-2) electrically connected to the corner touch electrodes CE are rounded.

In addition, as illustrated in FIG. 7, when the plurality of touch lines TL-1 and TL-2 electrically connecting all or portions of the plurality of touch electrodes TE to a touch circuit TC are disposed on the touchscreen panel TSP having the rounded corner areas, the corner shape of the touch lines (e.g. TL-2) electrically connected to the corner touch electrodes CE may be different from the corner shape of the touch lines (e.g. TL-1) electrically connected to the non-corner touch electrodes. In specific, the touch lines TL-2 electrically connected to the corner touch electrodes CE can have rounded corners. By contrast, other touch lines TL-1 have 90 degree non-rounded corners.

Thus, when the peripheral portions of the corner areas of the touch electrode area TEA of the touchscreen panel TSP are rounded, the corner touch electrodes CE and the touch lines TL may be designed to have suitable structures, thereby helping the touchscreen panel TSP to be designed as desired.

Figure 8:
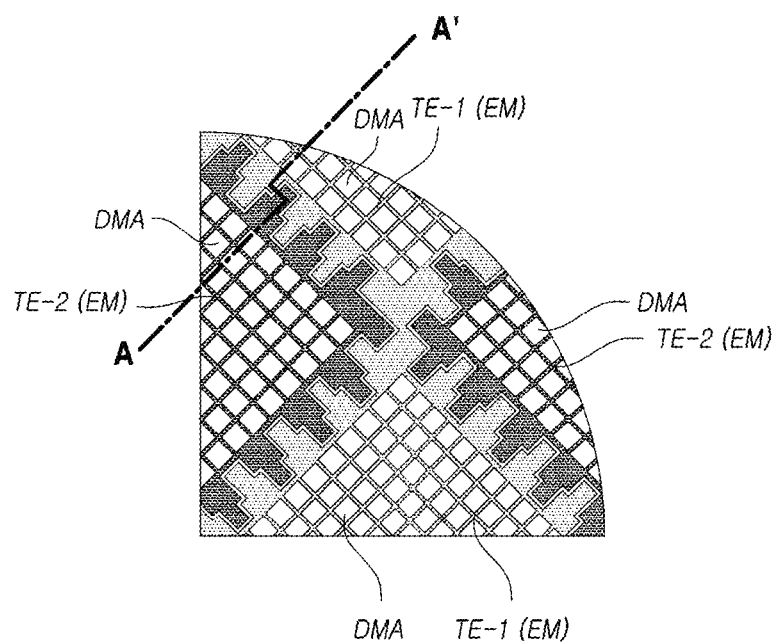
FIG. 8 is a plan view illustrating a corner area of the touchscreen panel according to exemplary embodiments.
Figure 9:
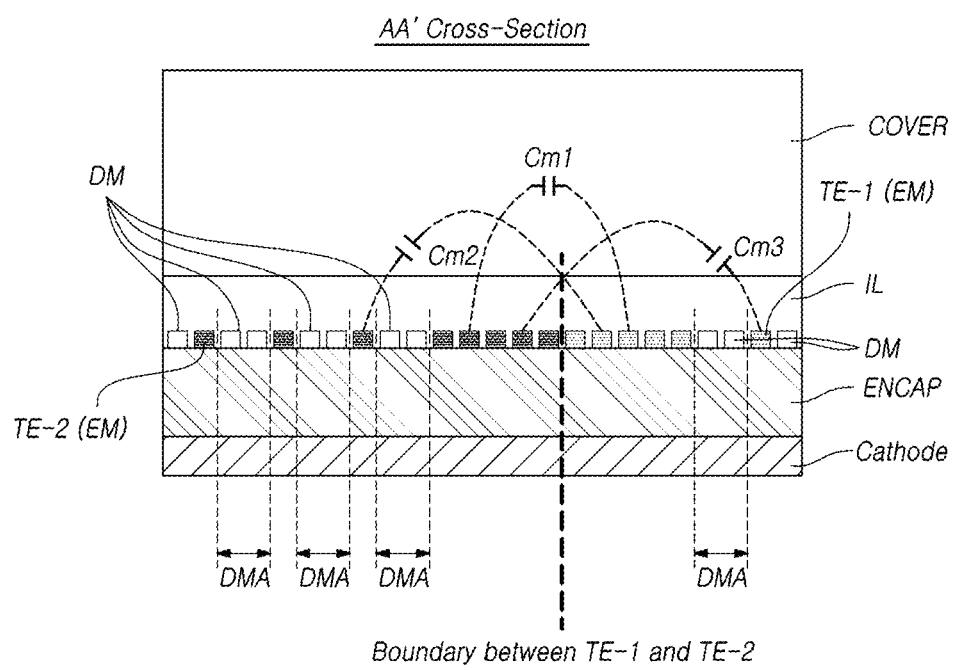
FIG. 9 is a cross-sectional view illustrating the corner area of the touchscreen panel according to exemplary embodiments.

FIG. 8 is a plan view illustrating a corner area of the touchscreen panel TSP according to exemplary embodiments, while FIG. 9 is a cross-sectional view illustrating the corner area of the touchscreen panel TSP according to exemplary embodiments.

The first and second touch electrodes TE-1 and TE-2 are embodied as mesh-type electrode metals EM, respectively.

Each area of the first and second touch electrodes TE-1 and TE-2 has dummy metal areas DMA in which dummy metals DM are present.

As illustrated in FIG. 8, two outermost touch electrodes TE-1 and TE-2 among four touch electrodes TE-1 and TE-2, corresponding to corner touch electrodes located in a corner area, have smaller sizes than the remaining touch electrodes.

Thus, capacitance formed between the first touch electrodes TE-1 and the second touch electrodes TE-2 in the inner area may have a significant difference from capacitance formed between first touch electrodes TE-1 and the second touch electrodes TE-2 in the corner area.

That is, capacitance formed between the first touch electrodes TE-1 and the second touch electrodes TE-2 in the corner area may be lower than capacitance formed between the first touch electrodes TE-1 and the second touch electrodes TE-2 in the inner area.

As illustrated in FIGS. 8 and 9, at or near the boundary between the first and second touch electrodes TE-1 and TE-2, no or fewer dummy metal areas DMA are present, thereby reducing the number of open areas OA. In addition, at or near the boundary between the first and second touch electrodes TE-1 and TE-2, the electrode metals EM are finely patterned.

This feature may cause a significant difference among capacitance Cm1 formed between a first touch electrode TE-1 and a second touch electrode TE-2 located at or near the boundary, capacitance Cm2 formed between a first touch electrode TE-1 located at or near the boundary and a second touch electrode TE-2 that is not located at or near the boundary, and capacitance Cm3 formed between a first touch electrode TE-1 that is not located at or near the boundary and a second touch electrode TE-2 located at or near the boundary.

As described above, a difference in capacitance may occur regardless of whether the peripheral portion of the touch electrode area TEA of the touchscreen panel TSP is rounded or not rounded (e.g. right angled).

However, as described above, when the peripheral portion of the touch electrode area TEA of the touchscreen panel TSP is rounded, a greater difference in capacitance may occur.

Such differences in capacitance related to the corner areas inevitably lower the level of touch sensitivity based on changes in capacitance.

Accordingly, exemplary embodiments provide a touchscreen panel structure that can improve touch sensitivity by reducing or removing differences in capacitance related to the corner area.

As described above, after an electrode metal EM is manufactured, dummy metals DM surrounded by the electrode metal EM can formed by cutting portions of the electrode metal EM in an intended pattern.

Due to the dummy metals DM formed as described above, the electrode metals EM and the dummy metals DM may be located on the same layer, as illustrated in FIG. 9.

Thus, the dummy metals can be more easily formed, together with the electrode metals EM, in positions in which the visibility problem can be overcome.

When the touchscreen panel TSP is disposed within the display panel 110 implemented as an OLED display panel, the touchscreen panel TSP is located between an encapsulation layer ENCAP and a display cover COVER.

Touch sensor metals, such as the plurality of touch electrodes TE, and the plurality of touch lines TL, are located between the encapsulation layer ENCAP and the display cover COVER.

The display cover COVER is an outer cover of the display panel 110. The display cover COVER may be implemented as a cover glass panel.

The encapsulation layer ENCAP is a layer protecting underlying materials (not shown), such as an organic material or similar, from moisture or oxygen.

A cathode layer that is the cathode of one or more OLEDs is present below the encapsulation layer ENCAP such that the encapsulation layer ENCAP is on the cathode. The thickness of the encapsulation layer ENCAP may be 5 µm or more.

Hereinafter, differences in capacitance related to the corner areas as described above and a touchscreen panel structure for preventing resultant touch sensitivity degradation will be described.

Figure 10:
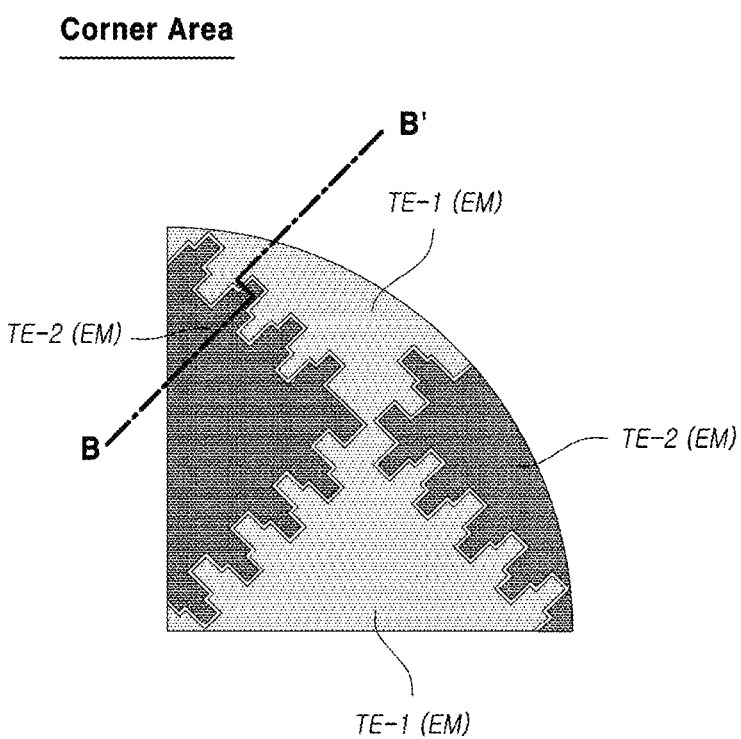
FIG. 10 is a plan view illustrating a corner area of another touchscreen panel according to exemplary embodiments, in which the ratio of dummy metals in the corner area is adjusted.
Figure 11:
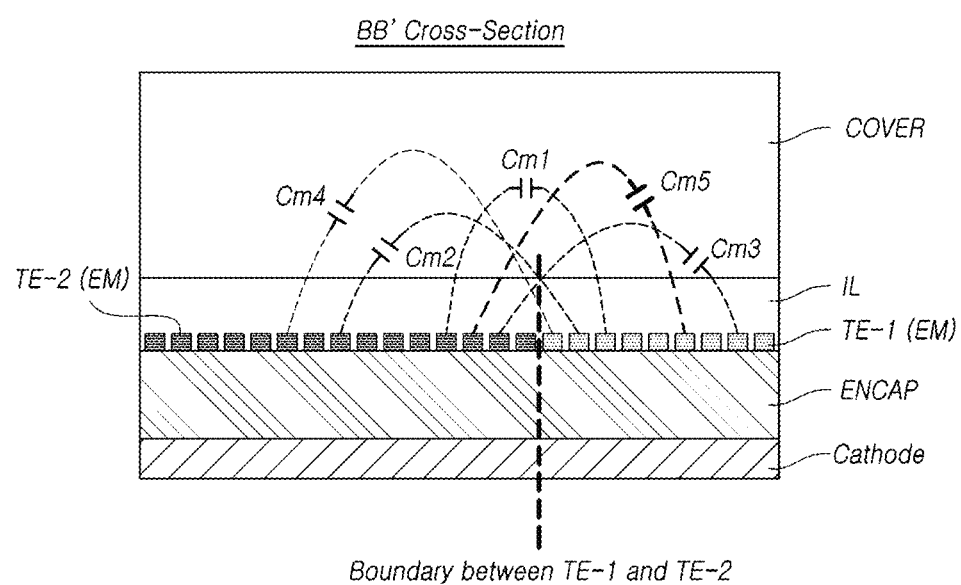
FIG. 11 is a cross-sectional view illustrating the corner area of another touchscreen panel according to exemplary embodiments, in which the ratio of the dummy metals in the corner area is adjusted.

FIG. 10 is a plan view illustrating a corner area of another touchscreen panel TSP according to exemplary embodiments, in which the ratio of dummy metals DM in the corner area is adjusted, while FIG. 11 is a cross-sectional view illustrating the corner area of another touchscreen panel TSP according to exemplary embodiments, in which the ratio of the dummy metals DM in the corner area is adjusted.

Referring to FIGS. 10 and 11, a plurality of touch electrodes TE are embodied as mesh-type electrode metals EM, respectively.

Referring to FIG. 10, two outermost touch electrodes TE-1 and TE-2 among four touch electrodes TE-1 and TE-2, corresponding to corner touch electrodes located in a corner area, have smaller sizes and therefore occupy less area than the other types of touch electrodes (edge touch electrodes EE and inner touch electrodes IE) located in non-corner areas (i.e. the edge areas and the inner area).

In the area of each non-corner touch electrode (e.g. each inner touch electrode IE), one or more dummy metals DM are located, electrically disconnected from the corresponding electrode metal EM. That is, the non-corner touch electrode may have a structure illustrated in FIG. 5A.

However, in each area of the corner touch electrodes CE, corresponding to the first and second touch electrodes TE-1 and TE-2 illustrated in FIG. 10, the mesh-patterned electrode metal EM may be present alone with (a) no dummy metals DM being provided therein or (b) the ratio of dummy metals in this area may be lower than the ratio of dummy metals in each area of the non-corner touch electrodes (the inner touch electrodes IE or edge electrodes EE).

Here, the ratio of dummy metals DM in the area of each touch electrode TE means a ratio B/A of a total area B of dummy metals DM in the area of a single touch electrode TE, with respect to a total area A of the single touch electrode TE.

The dummy metal ratio may vary depending on, for example, the number of the dummy metals DM in the area of the touch electrode or the total area of the dummy metals DM in the area of the touch electrode.

The dummy metal ratio of dummy metals DM in each area of the touch electrodes TE may be inversely proportional to an effective electrode ratio of a portion to which touch driving signals are applied (i.e. a portion substantially acting as an electrode) in each area of the touch electrodes TE.

More specifically, dummy metals DM, electrically disconnected from the electrode metal EM and in a same layer as the electrode metal EM, may not be present in each area of the corner touch electrodes CE, corresponding to the first and second touch electrodes TE-1 and TE-2 illustrated in FIG. 10.

Alternatively, dummy metals DM may be present in each area of the corner touch electrodes CE, corresponding to the first and second touch electrodes TE-1 and TE-2 illustrated in FIG. 10, at a ratio lower than the ratio of dummy metals DM in each area of the non-corner touch electrodes (the inner touch electrodes IE or edge touch electrodes EE).

As described above, the effective electrode ratio of a portion to which touch driving signals are applied (i.e. a portion substantially acting as an electrode) in each area of the corner touch electrodes CE may be increased.

Here, the effective electrode ratio is a ratio D/C of a total area D of a portion actually functioning as an electrode, except for open areas, dummy metal areas, and the like, with respect to a total area C of a touch electrode TE.

As described above, when the ratio of dummy metals DM with respect to the corner touch electrodes CE is reduced (i.e. the effective electrode ratio is increased), although the size of each of the corner touch electrodes CE is smaller than the size of each of the non-corner electrodes (the inner touch electrodes IE), the effective electrode area of each corner touch electrode CE is equal or similar to the effective electrode area of each non-corner electrode. Thus, the difference in capacitance between the corner areas and the non-corner areas can be reduced or removed.

The effective electrode area means the area of the portion that actually functions as the electrode.

FIGS. 10 and 11 are plan and cross-sectional views illustrating a case in which any dummy metals DM are not present in the areas of the corner touch electrodes CE corresponding to the first and second touch electrodes TE-1 and TE-2.

In the case of FIG. 9, capacitance was decreased due to the presence of the dummy metal areas DMA. In contrast, in the case of FIG. 11, additional capacitance Cm4 and Cm5 was created compared to the case of FIG. 9, since the electrode metals EM were increased due to the absence of the dummy metals DM.

Due to additional capacitance compensation, a difference among capacitance Cm1 formed between a first touch electrode TE-1 and a second touch electrode TE-2 located at or near the boundary, capacitance Cm2 and Cm4 formed between a first touch electrodes TE-1 located at or near the boundary and a second touch electrode TE-2 not located at or near the boundary, and capacitance Cm3 and Cm5 formed between a first touch electrode TE-1 not located at or near the boundary and a second touch electrode TE-2 located at or near the boundary can be removed or significantly reduced.

According to the structure of adjusting the dummy metal ratio, although the corner touch electrodes CE have smaller areas, the effective electrode area of each of the corner touch electrodes CE is equal or similar to the effective electrode area of each of the non-corner touch electrodes (inner touch electrodes IE). This can consequently reduce or remove the difference in capacitance between the corner areas and the non-corner areas, thereby improving touch sensitivity.

As described above, the plurality of touch electrodes TE include edge touch electrodes EE and inner touch electrodes IE as non-corner touch electrodes, the edge touch electrodes EE being located in the edge areas of the touchscreen panel TSP, and the inner touch electrodes IE being located in the inner area of the touchscreen panel TSP, inside of the edge areas and the corner areas.

In this case, the sizes of the edge touch electrodes EE are greater than the sizes of the corner touch electrodes CE.

The sizes of the edge touch electrodes EE are smaller than or equal to the sizes of the inner touch electrodes IE.

Dummy metals DM, electrically disconnected from the electrode metal EM and in a same layer as the electrode metal EM, may not be present in each area of the edge touch electrodes EE.

Alternatively, dummy metals DM may be present in each area of the edge touch electrodes EE, at a ratio higher than the ratio of dummy metals DM in each area of the corner touch electrodes CE.

Also, dummy metals DM may be present in each area of the edge touch electrodes EE, at a ratio lower than the ratio of dummy metals DM in each area of the inner touch electrodes IE.

In other words, each inner electrode IE can occupy a certain area and be made from mesh shaped metal EM. Dummy metal DM can be in a same layer as the mesh shaped metal EM and be located in the area occupied by the inner electrode IE. Similarly, there can be dummy metal DM in an area occupied by an edge electrode EE but at a lower dummy metal ratio than the inner electrodes IE. Or there can be no dummy metal DM at all in the areas occupied by the edge electrodes EE. There can also be dummy metal DM in the area of a corner electrode CE but at a lower dummy metal ratio than the inner electrodes IE and edge electrodes EE. Or there can be no dummy metal DM at all in the areas occupied by corner electrode CEs.

Figure 12:
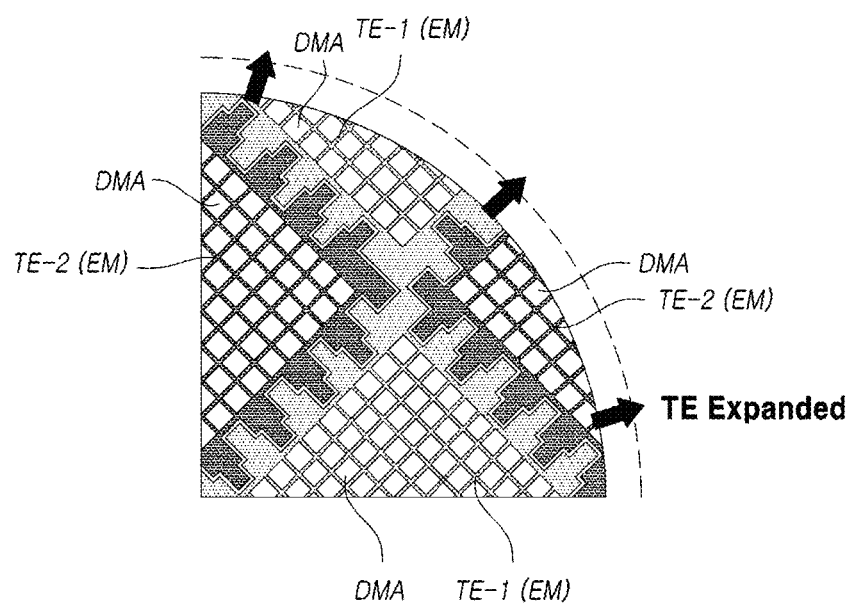
FIG. 12 illustrates a case in which the sizes of touch electrodes located in corner areas of the touchscreen panel according to exemplary embodiments are increased.

FIG. 12 illustrates a case in which the sizes of touch electrodes TE located in corner areas of the touchscreen panel TSP according to exemplary embodiments are increased.

As described above, it is possible to reduce or remove differences in capacitance related to the corner area by adjusting the ratio of the area of the dummy metals DM in the area of the touch electrodes TE-1 and TE-2 corresponding to the corner touch electrodes CE.

Alternatively, as illustrated in FIG. 12, it is possible to reduce or remove differences in capacitance related to the corner area by increasing the sizes of the touch electrodes TE-1 and TE-2 corresponding to the corner touch electrodes CE.

Although the touch electrodes TE-1 and TE-2 in the touch electrode structure of FIG. 8 are illustrated as being expanded in FIG. 12, the touch electrodes TE-1 and TE-2 in the touch electrode structure of FIG. 10 may also be expanded.

The expanded portions of the touch electrodes TE-1 and TE-2 may be present outside of the active area in which images are displayed. That is, all of the touch electrodes TE, are present in the active area, but the expanded portions of the touch electrodes may be present outside of the active area.

Hereinabove, the structure and method for reducing or removing differences in capacitance (i.e. mutual-capacitance differences) related to the corner areas, in the touchscreen panel TSP for mutual-capacitance-based touch sensing, have been described.

However, the method and structure for adjusting the ratio of dummy metals DM in the area of the corner electrodes CE and the method and structure for increasing the sizes of the corner touch electrodes CE to reduce or removing differences in capacitance related to the corner areas as described above can be equally applied to the touchscreen panel TSP for self-capacitance-based touch sensing. This will be briefly described with reference to FIGS. 13 and 14.

Figure 13:
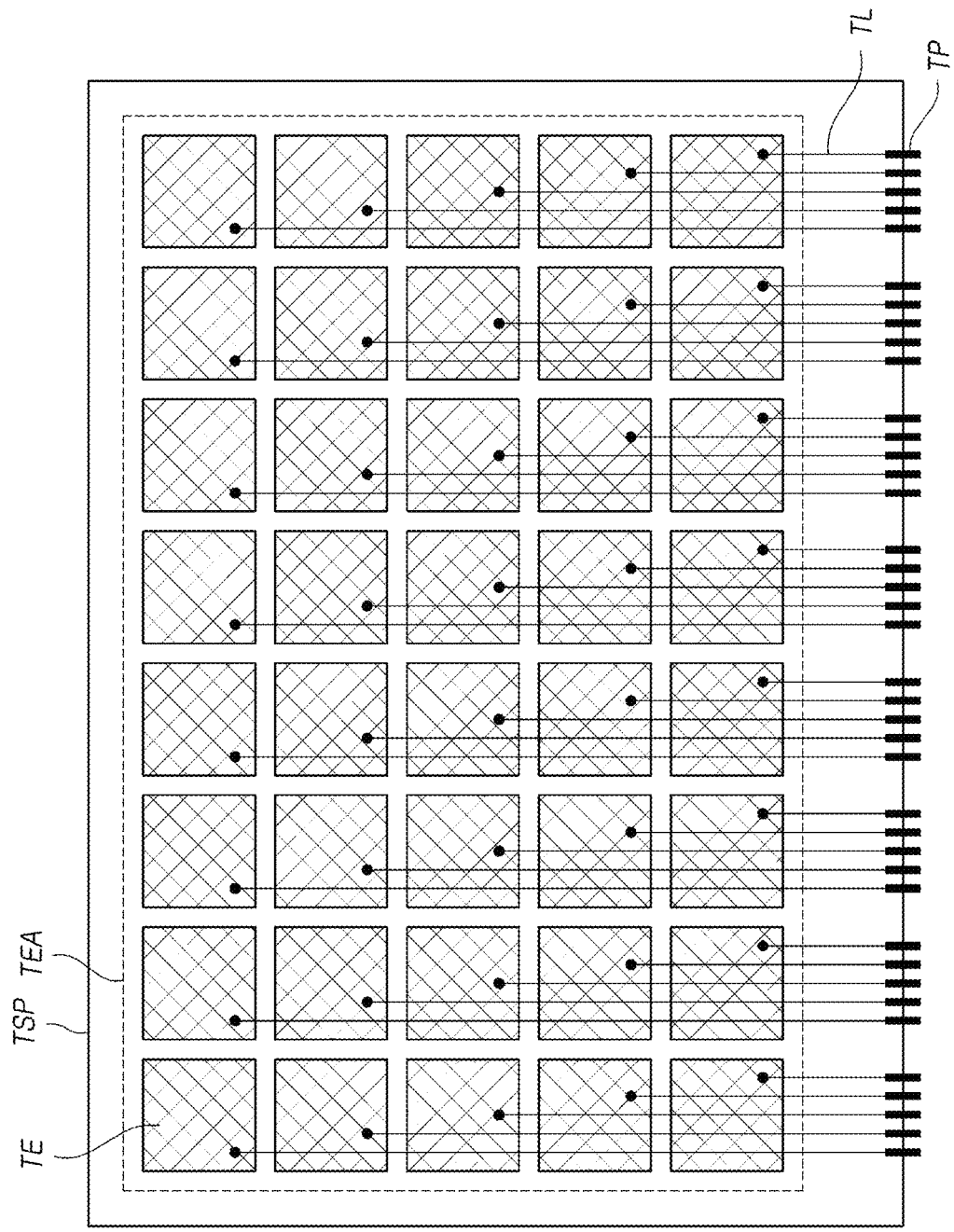
FIG. 13 illustrates another exemplary touchscreen panel according to exemplary embodiments.
Figure 14:
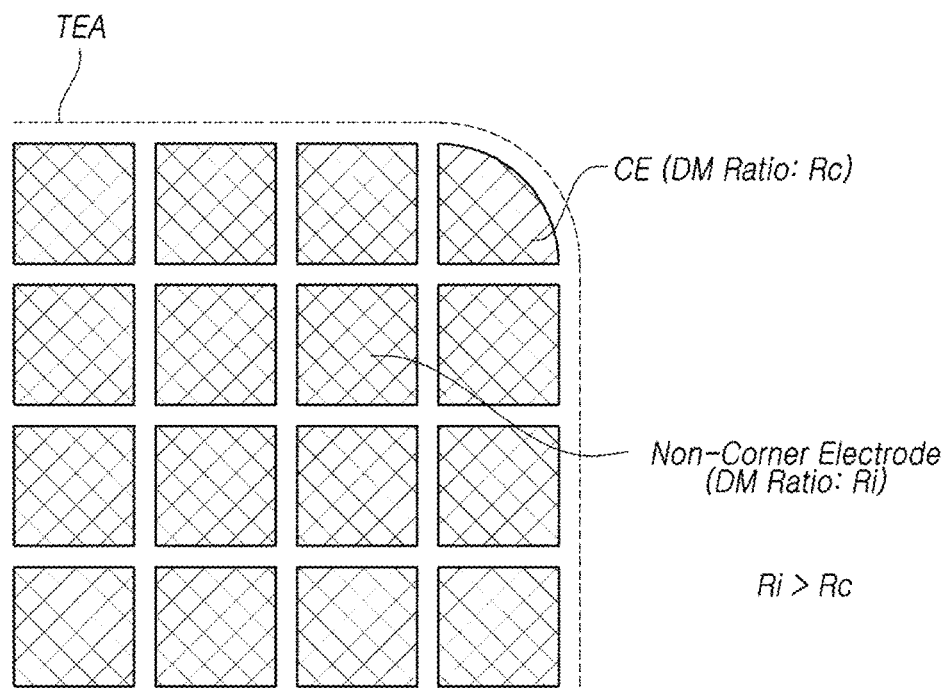
FIG. 14 is a plan view illustrating a corner area of the touchscreen panel illustrated in FIG. 13, in the case in which the ratio of dummy metals in the corner area is adjusted.

FIG. 13 illustrates another exemplary touchscreen panel TSP according to exemplary embodiments, while FIG. 14 is a plan view illustrating a corner area of the touchscreen panel TSP illustrated in FIG. 13, in the case in which the ratio of dummy metals DM in the corner area is adjusted.

Referring to FIG. 13, the touchscreen panel TSP according to exemplary embodiments may be a touchscreen panel TSP for self-capacitance-based touch sensing.

In this case, a plurality of touch electrodes TE, are electrically separated from each other.

In addition, the plurality of touch electrodes TE are electrically connected to touch lines TL, respectively.

As illustrated in FIG. 14, when corner areas of a touch electrode area FBA are rounded, corner touch electrodes CE, corresponding to touch electrodes TE located in the corner areas, may be smaller than a non-corner electrode (ex. inner touch electrodes IE, edge touch electrode EE), corresponding to touch electrodes TE located in an non-corner area (ex. inner area, edge area) rather than the corner areas.

This feature may lead to a difference between capacitance (self-capacitance) formed between a corner touch electrode CE and a user's finger and capacitance (self-capacitance) formed between a non-corner touch electrode (IE or CE) and the user's finger.

Thus, the corner touch electrodes CE may be designed such that no dummy metals DM are present in the areas of the corner touch electrodes CE or the ratios of dummy metals DM in the areas of the corner touch electrodes CE are reduced.

Then, the ratio Rc of dummy metals DM in each area of the corner touch electrodes CE is lower than the ratio Ri of dummy metals DM in each area of non-corner touch electrodes (IE or EE).

The adjustment of the ratio of dummy metals can increase the effective electrode areas of portions of the corner touch electrodes CE to which touch driving signals are applied (i.e. portions actually acting as electrodes).

Thus, the effective electrode area of each of the corner touch electrodes CE can be the same as or equivalent to the effective electrode area of each of the non-corner touch electrodes.

It is therefore possible to reduce or remove the difference between capacitance (self-capacitance) formed between the corner touch electrodes CE and the user's finger and capacitance (self-capacitance) formed between the non-corner touch electrodes and the user's finger.

As described above, in the structure of the touchscreen panel TSP for self-capacitance-based touch sensing, capacitance differences related to the corner areas can be reduced or removed, thereby improving self-capacitance-based touch sensitivity.

Figure 15:
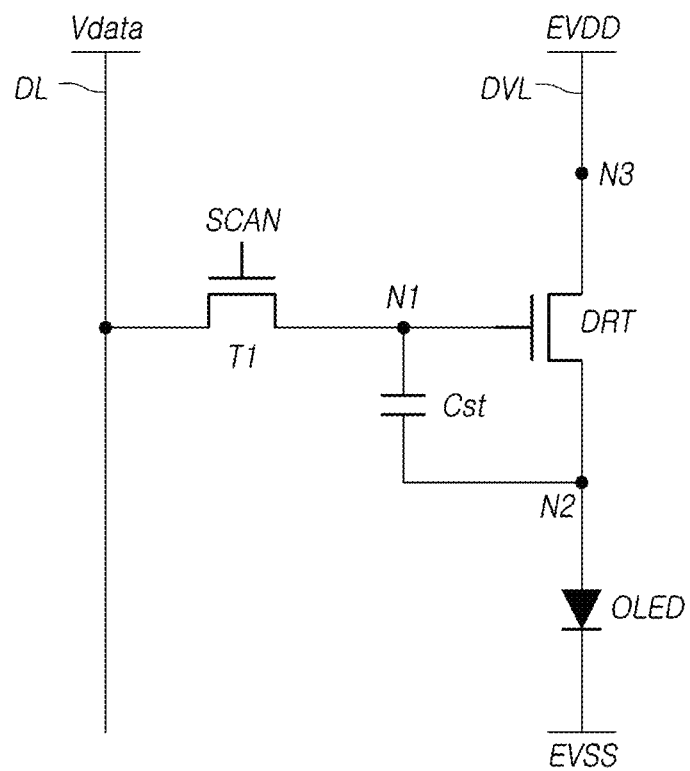
FIGS. 15 and 16 are circuit diagrams illustrating subpixel structures in the touch display device according to exemplary embodiments.
Figure 16:
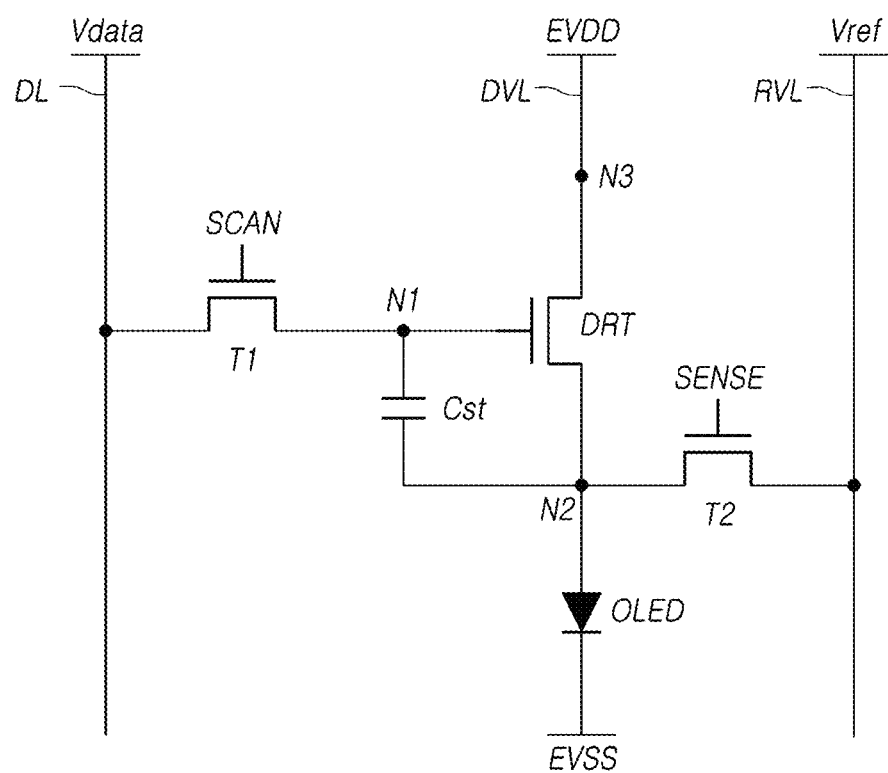

FIGS. 15 and 16 are circuit diagrams illustrating subpixel structures in the touch display device 100 according to exemplary embodiments.

Referring to FIG. 15, when the touch display device 100 according to exemplary embodiments is an OLED display device, each of subpixels basically includes an OLED, a driving transistor DRT driving the OLED, a first transistor T1 transferring a data voltage to a first node N1 corresponding to a gate node of the driving transistor DRT, and a storage capacitor Cst maintaining a data voltage corresponding to an image signal voltage or a voltage corresponding thereto for a period of a single frame.

The OLED includes a first electrode (e.g. an anode or a cathode), an organic layer, a second electrode (e.g. a cathode or an anode), and the like.

A base voltage EVSS is applied to the second electrode of the OLED.

The driving transistor DRT drives the OLED by supplying a driving current to the OLED.

The driving transistor DRT includes a first node N1, a second node N2, and a third node N3.

The first node N1 of the driving transistor DRT is a node corresponding to the gate node, which can be electrically connected to a source node or a drain node of the first transistor T1.

The second node N2 of the driving transistor DRT is a source node or a drain node, which can be electrically connected to the first electrode of the OLED.

The third node N3 of the driving transistor DRT is a node to which a driving voltage EVDD is applied. The third node N3 is a drain node or a source node, which can be electrically connected to a driving voltage line DVL through which the driving voltage EVDD is supplied.

The first transistor T1 is electrically connected between the data line DL and the first node N1 of the driving transistor DRT. The first transistor T1 can be controlled by a scanning signal SCAN applied to the gate node through a gate line.

The first transistor T1 is turned on by the scanning signal SCAN to transfer a data voltage Vdata supplied through a data line DL to the first node N1 of the driving transistor DRT.

The storage capacitor Cst is electrically connected between the first node N1 and the second node N2 of the driving transistor DRT.

The storage capacitor Cst is an external capacitor intentionally designed to be outside of the driving transistor DRT, instead of being a parasitic capacitor (e.g. Cgs or Cgd), i.e. an internal capacitor, present between the first node N1 and the second node N2.

As illustrated in FIG. 16, each subpixel further includes a second transistor T2 to control the voltage of the second node N2 of the driving transistor DRT or sense characteristic values of the subpixel (e.g. the threshold voltage or mobility of the driving transistor DRT, the threshold voltage of the OLED, and the like).

The second transistor T2 is electrically connected between the second node N2 of the driving transistor DRT and a reference voltage line RVL, through which a reference voltage Vref is supplied. The second transistor T2 is controlled by a sensing signal SENSE, i.e. a type of scanning signal, applied to a gate node thereof.

The second transistor T2 is turned on by the sensing signal SENSE to apply the reference voltage Vref, supplied through the reference voltage line RVL, to the second node N2 of the driving transistor DRT.

In addition, the second transistor T2 can be used as one of voltage sensing paths to the second node N2 of the driving transistor DRT.

The scanning signal SCAN and the sensing signal SENSE may be separate gate signals. In this case, the scanning signal SCAN and the sensing signal SENSE can be applied to the gate node of the first transistor T1 and the gate node of the second transistor T2, respectively, through different gate lines.

In some cases, the scanning signal SCAN and the sensing signal SENSE may be the same gate signals. In this case, the scanning signal SCAN and the sensing signal SENSE can be commonly applied to the gate node of the first transistor T1 and the gate node of the second transistor T2 through the same gate line.

The driving transistor DRT, the first transistor T1, and the second transistor T2 may be an n-transistor or a p-transistor.

Figure 17:
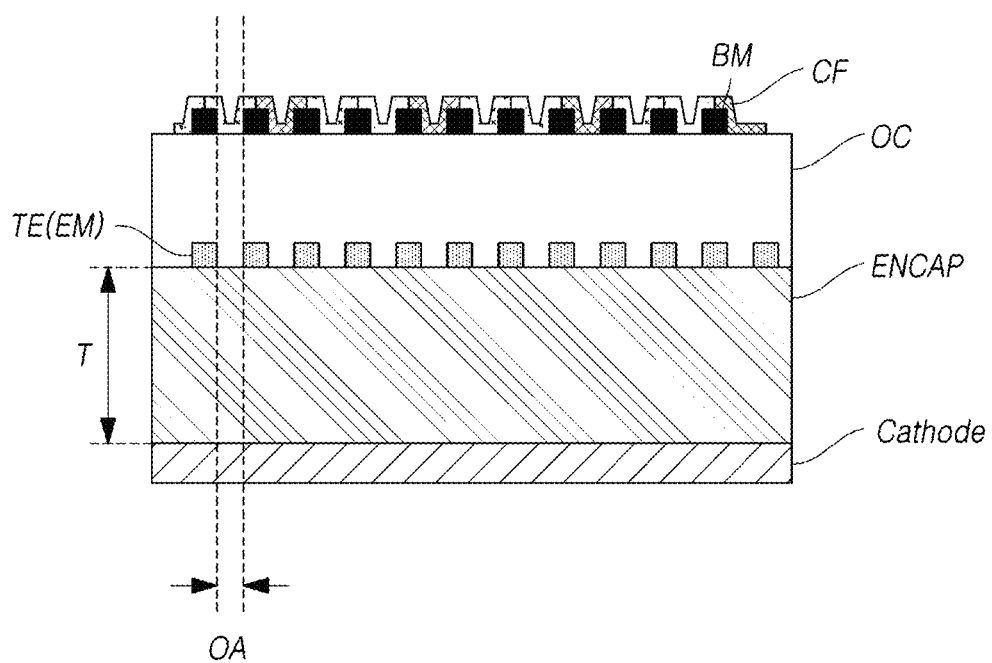
FIGS. 17 and 18 are cross-sections of the touch display device according to exemplary embodiments.
Figure 18:
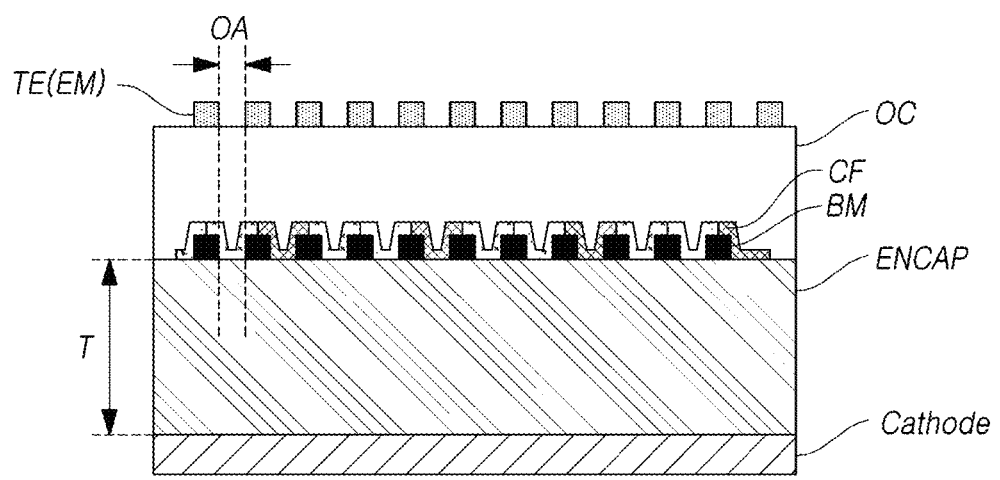

FIGS. 17 and 18 are cross-sections of the touch display device 100 according to exemplary embodiments.

Referring to FIGS. 17 and 18, when the touchscreen panel TSP is disposed within the display panel 110 implemented as an OLED display panel, the touchscreen panel TSP may be located between an encapsulation layer ENCAP and a display cover.

In other words, touch sensor metals, such as a plurality of touch electrodes TE and a plurality of touch lines TL, may be located on the encapsulation layer ENCAP.

Since the touch electrodes TE are formed on the encapsulation layer ENCAP as described above, it is possible to form the touch electrodes TE without an influence on displaying performance or formation of layers for display.

In the case of mutual-capacitance-based touch sensing, bridge patterns BP are provided to connect the driving electrodes and/or connect the sensing electrodes among the plurality of touch electrodes TE. The bridge patterns BP may be located on a layer different from the layer of the touch electrodes TE, with an insulating layer being situated between the two layers.

Referring to FIGS. 17 and 18, the bridge patterns BP and the insulating layer between the touch electrodes TE and the bridge patterns BP are not illustrated for convenience of description.

Referring to FIGS. 17 and 18, a cathode layer that is the cathode of one or more OLEDs is present below the encapsulation layer ENCAP. The encapsulation layer ENCAP is thus on the cathode layer. The touch electrodes TE are directly on or indirectly on the encapsulation layer ENCAP.

The thickness of the encapsulation layer ENCAP may, for example, 5 µm or more.

When the thickness of the encapsulation layer ENCAP is designed to be 5 µm or more as described above, parasitic capacitance formed between the cathode layer and the touch electrodes TE, can be reduced. This can prevent touch sensitivity from being lowered by parasitic capacitance.

When the touch electrodes TE, are embodied as mesh-type electrode metals EM having the open areas OA, the position of each of the open areas OA may overlap the position of one or more subpixels or one or more light-emitting portions in the top-bottom direction.

Thus, as illustrated in FIGS. 17 and 18, the plurality of open areas OA correspond to a plurality of color filters CF.

In addition, the electrode metals EM of the touch electrodes TE correspond to black matrices BM.

As described above, when the OLED display panel uses white LEDs, the required color filters CF are disposed in positions corresponding to the open areas OA, thereby providing superior lighting performance to the touch display device 100.

The vertical positional relationship between the color filers CR and the touch electrodes TE are as follows:

As illustrated in FIG. 17, the plurality of color filters CF and the black matrices BM are located above the plurality of touch electrodes TE.

The plurality of color filters CF and the black matrices BM are located above an overcoat OC on the plurality of touch electrodes TE.

As illustrated in FIG. 18, the plurality of color filters CF and the black matrices BM are located below the plurality of touch electrodes TE.

The plurality of touch electrodes TE are located on the overcoat OC above the plurality of color filters CF and the black matrices BM.

As described above, it is possible to provide the touch display device 100 having an optimal positional relationship between the color filters CF and the touch electrodes TE, considering displaying performance, such as lighting performance, and touch performance.

To improve the ease of fabrication of the touch display device 100 and reduce the size of the touch display device 100, in the related art, approaches for disposing the touchscreen panel TSP including the touch electrodes TE within the display panel 110 have been undertaken.

However, such approaches for disposing the touchscreen panel TSP within the OLED display panel 110 confront significant difficulties and restrictions.

For example, in fabrication of the OLED display panel 110, organic matters reduce the degree of freedom of high-temperature processing for forming the touch electrodes TE, typically formed of metal, within the panel.

Due to the restrictions caused by the structural and processing characteristics of the OLED display panel, it is difficult to dispose the touch electrodes TE functioning as touch sensors within the OLED display panel 110. Therefore, in the related art, the touch sensing structure has been realized by attaching the touchscreen panel TSP to the OLED display panel 110 instead of disposing the touchscreen panel TSP within the OLED display panel 110.

In contrast, as illustrated in FIGS. 17 and 18, the structure with the touch electrodes TE disposed on the encapsulation layer ENCAP makes it possible to provide the OLED display panel 110 with the touchscreen panel TSP disposed therewithin, the OLED display panel 110 having superior displaying and touch sensing functions.

Figure 19:
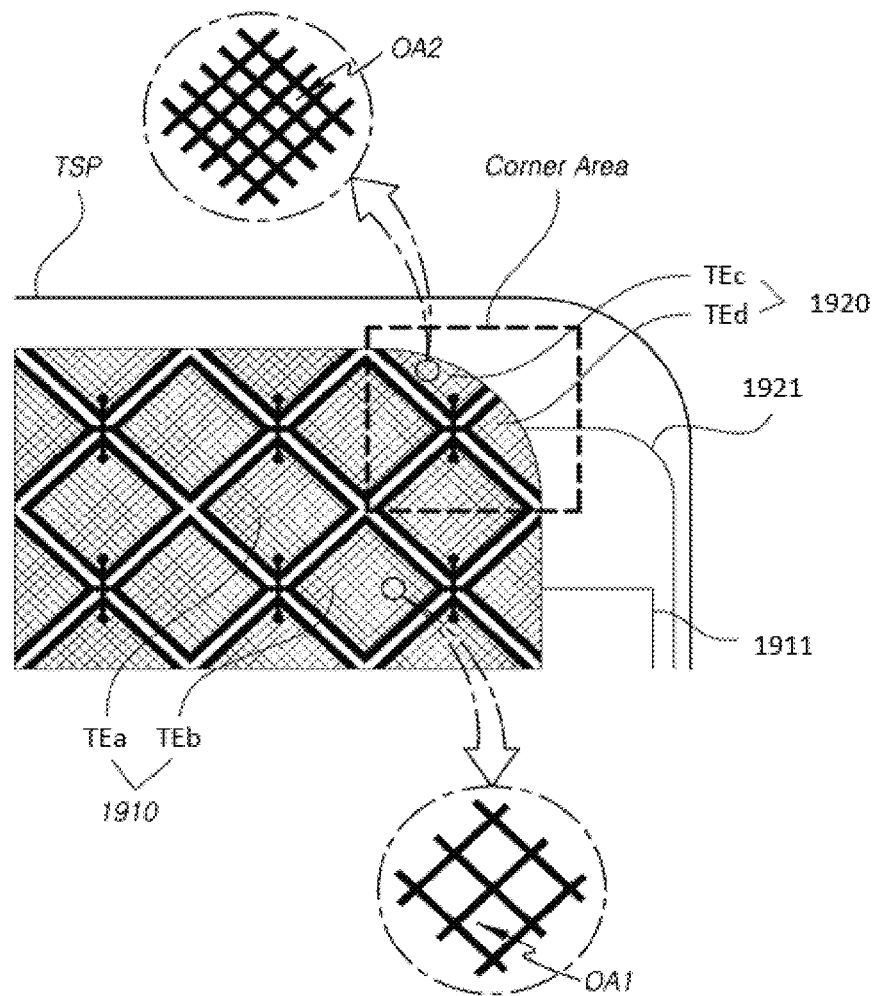
FIG. 19 illustrates touch electrodes in the touchscreen panel according to exemplary embodiments.

FIG. 19 illustrates touch electrodes (TEa, TEb, TEc, TEd in the touchscreen panel according to exemplary embodiments.

Referring to FIG. 19, a plurality of touch electrodes TE included in a touch display device according to embodiments of the present invention includes a first pair (1910) of immediately adjacent touch electrodes (TEa, TEb) and a second pair (1920) of immediately adjacent touch electrodes (TEc, TEd).

In the second pair (1920) of adjacent touch electrodes (TEc, TEd), there may be no dummy metals or the dummy metal ratio may be relatively small.

The first pair (1910) of immediately adjacent touch electrodes (TEa, TEb) are a first electrode metal patterned with a mesh type. The second pair (1920) of immediately adjacent touch electrodes (TEc, TEd) are a second electrode metal patterned with a mesh type.

The first pair (1910) of adjacent touch electrodes (TEa, TEb) occupies a larger area than the second pair (1920) of adjacent touch electrodes (TEc, TEd).

The second pair (1920) of adjacent touch electrodes (TEc, TEd) may not have dummy metals. Alternatively, the second pair (1920) of adjacent touch electrodes (TEc, TEd) may have a smaller dummy metal ratio than the first pair (1910) of adjacent touch electrodes (TEa, TEb).

Therefore, an open area size (OA1) of the first electrode metal is larger than an open area size (OA2) of the second electrode metal. In other words, a mesh hole size (open area size) of the first electrode metal is larger than a mesh hole (open area size) of the second electrode metal.

The first pair (1910) of immediately adjacent touch electrodes (TEa, TEb) is in a non-corner region of a touchscreen panel and the second pair (1920) of immediately adjacent touch electrodes (TEc, TEd) is in a corner region of the touchscreen panel.

A corner shape of a first touch line (1911) electrically connected to a touch electrode (TEb) of the first pair (1910) of immediately adjacent touch electrodes (TEa, TEb) is different than a corner shape of a second touch line (1921)

electrically connected to a touch electrode (TEd) of the second pair (1920) of immediately adjacent touch electrodes (TEc, TEd).

The second touch line (1921) has a portion with a rounded corner shape.

According to the exemplary embodiments as set forth above, the touch display device 100 and the touchscreen panel TSP can obtain high touch sensitivity by preventing or removing undesired differences in capacitance formed among touch electrodes located in all positions, regardless of the positions of the touch electrodes.

In addition, according to the exemplary embodiments, the touch display device 100 and the touchscreen panel TSP can perform accurate capacitance-based touch sensing, regardless of the shapes of the touchscreen panel.

Furthermore, according to the exemplary embodiments, the touch display device 100 and the touchscreen panel TSP can obtain high touch sensitivity by preventing undesired differences in capacitance among touch electrodes, even in the case in which the touch electrodes have different sizes.

In addition, according to the exemplary embodiments, the touch display device 100 and the touchscreen panel TSP can obtain high touch sensitivity by preventing undesired differences in capacitance among touch electrodes, even in the case in which the touch electrodes have different shapes.

Furthermore, according to the exemplary embodiments, the touch display device 100 and the touchscreen panel TSP can obtain high touch sensitivity in all areas by reducing undesired differences in capacitance between touch electrodes located in rounded corner areas and touch electrodes located in the other areas.

The foregoing descriptions and the accompanying drawings have been presented in order to explain the certain principles of the present disclosure. A person skilled in the art to which the present disclosure relates could make many modifications and variations by combining, dividing, substituting for, or changing the elements without departing from the principle of the present disclosure. The foregoing embodiments disclosed herein shall be interpreted as illustrative only but not as limitative of the principle and scope of the present disclosure. It should be understood that the scope of the present disclosure shall be defined by the appended Claims and all of their equivalents fall within the scope of the present disclosure.

What is claimed is:

1. A touch display device comprising:
a display panel including a display driving electrode; and
a touch sensor including a first portion, a second portion, and a third portion,
wherein the first portion, the second portion, and the third portion are different in size from one another, and
wherein a first area in which the first portion of the touch sensor overlaps the display driving electrode, a second area in which the second portion of the touch sensor overlaps the display driving electrode, and a third area in which the third portion of the touch sensor overlaps the display driving electrode are different in size from one another,
wherein the touch sensor comprises a plurality of touch electrodes, the plurality of touch electrodes comprising a first touch electrode located in a corner area of the touch sensor, a second touch electrode located in an edge area of the touch sensor, and a third touch electrode located in an inner area of the touch sensor, and
wherein the corner area comprises four corners, in each of which the first touch electrode having a rounded edge is disposed.

2. The touch display device according to claim 1, wherein the first portion, the second portion, the third portion correspond to the corner area, the edge area, and the inner area, respectively, of the touch sensor, and the first area is smaller than the second area and the third area.

3. The touch display device according to claim 2, wherein the second area is greater than the first area and is not greater than the third area.

4. The touch display device according to claim 1, wherein the touch sensor comprises a plurality of mesh-type touch electrodes.

5. The touch display device according to claim 1, further comprising a cathode layer corresponding to the display driving electrode and an encapsulation layer located on the cathode layer,
wherein the touch sensor is located on the encapsulation layer.

6. The touch display device according to claim 5, further comprising color filters located on the encapsulation layer.

7. The touch display device according to claim 1, wherein the touch sensor has a plurality of open areas, and dummy metal is disposed in at least some of the open areas, the dummy metal being disconnected from an electrode metal of the touch sensor.

8. The touch display device according to claim 7, wherein the dummy metal is electrically floated when an electrical signal is applied to the touch sensor.

9. The touch display device according to claim 7, wherein the touch sensor and the dummy metal are located on a same layer.

10. The touch display device according to claim 7, wherein each of the open areas in the touch sensor corresponds to a light-emitting portion of one or more subpixels of the display panel.

11. The touch display device according to claim 1, wherein, among a first overlapping area in which the first touch electrode overlaps the display driving electrode, a second overlapping area in which the second touch electrode overlaps the display driving electrode, and a third overlapping area in which the third touch electrode overlaps the display driving electrode, the first overlapping area has a smallest size.

12. The touch display device according to claim 1, further comprising one or more first dummy metals present in a first touch electrode area occupied by the first touch electrode, one or more second dummy metals present in a second touch electrode area occupied by the second touch electrode, and one or more third dummy metals present in a third touch electrode area occupied by the third touch electrode,
wherein at least one of an overlapping area in which the one or more first dummy metals overlap the display driving electrode, an overlapping area in which the one or more second dummy metals overlap the display driving electrode, and an overlapping area in which the one or more third dummy metals overlap the display driving electrode has a different size from the remaining overlapping areas.

13. The touch display device according to claim 1, wherein the first touch electrode comprises an extension portion extending to a peripheral portion of an active area of the display panel in which an image is displayed.

14. The touch display device according to claim 13, wherein the first touch electrode has an open area present in the extension portion of the first touch electrode, the open area corresponding to a non-active area of the display panel.

15. The touch display device according to claim 13, wherein the extension portion of the first touch electrode overlaps a non-active area of the display panel.

16. The touch display device according to claim 1, wherein the touch sensor comprises a plurality of touch electrodes, the plurality of touch electrodes comprising:
   a first touch electrode located in the corner area of the touch sensor;
   a second touch electrode located in the edge area of the touch sensor;
   a third touch electrode located in the inner area of the touch sensor to be electrically connected to the first touch electrode; and
   a fourth touch electrode located in the inner area of the touch sensor to be electrically connected to the second touch electrode.

17. The touch display device according to claim 16, further comprising a plurality of touch lines corresponding to and electrically connected to the plurality of touch electrodes,
   wherein the plurality of touch lines comprise a first touch line electrically connected to the first touch electrode and a second touch line electrically connected to the second touch electrode.

18. The touch display device according to claim 17, wherein the first touch line is disposed along an edge of a first touch electrode area occupied by the first touch electrode, the second touch line is disposed along an edge of a second touch electrode area occupied by the second touch electrode, and the edge of the first touch electrode area is rounded.

19. The touch display device according to claim 17, wherein the first touch line is connected to a first peripheral portion of electrode metal defining the first touch electrode, and the second touch line is connected to a second peripheral portion of the electrode metal defining the second touch electrode.

20. The touch display device according to claim 19, wherein the first peripheral portion of the electrode metal defining the first touch electrode, the second peripheral portion of the electrode metal defining the second touch electrode, and a third peripheral portion of the electrode metal defining the third touch electrode have different shapes from one another,
   a fourth peripheral portion of the electrode metal defining the fourth touch electrode has substantially the same shape as the first peripheral portion of the electrode metal defining the first touch electrode or the third peripheral portion of the electrode metal defining the third touch electrode.

21. The touch display device according to claim 17, further comprising:
   a first touch pad electrically connecting the first touch line and a touch circuit; and
   a second touch pad electrically connecting the second touch line and the touch circuit.

22. The touch display device according to claim 21, wherein the first touch pad comprises first metal in contact with the first touch line, and the second touch pad comprises second metal in contact with the second touch line.

23. The touch display device according to claim 17, wherein one of the first touch line and the second touch line is disposed along a side surface of the other of the first touch line and the second touch line.

24. The touch display device according to claim 17, wherein the plurality of touch electrodes are located on a same layer as the plurality of touch lines.

25. The touch display device according to claim 17, wherein the plurality of touch electrodes are located on a different layer from the plurality of touch lines.

26. The touch display device according to claim 17, further comprising a first bridge pattern electrically connecting the first touch electrode and the third touch electrode.

27. The touch display device according to claim 26, wherein the first bridge pattern is located on a different layer from the first touch electrode and the third touch electrode, with an insulating layer being situated between the first bridge pattern and the first and third touch electrodes.

28. The touch display device according to claim 26, wherein the first bridge pattern is located on a different layer from the first touch electrode and the third touch electrode, the first touch line is located on a different layer from the first touch electrode and the third touch electrode, and the first touch line and the first bridge pattern are located on a same layer.

29. The touch display device according to claim 26, further comprising a second bridge pattern electrically connecting the second touch electrode and the fourth touch electrode.

30. The touch display device according to claim 17, wherein each of the first to fourth touch electrodes has one or more open areas,
   the open area size of the first touch electrode being different from the open area size of the second touch electrode, the open area size of the third touch electrode, and the open area size of the fourth touch electrode.

31. The touch display device according to claim 30, wherein the open area size of the first touch electrode is the size of all of the open areas of the first touch electrode.

32. The touch display device according to claim 30, wherein the open area size of the first touch electrode is the size of a single open area of the first touch electrode.

33. The touch display device according to claim 1, wherein the touch sensor comprises a plurality of touch electrodes, the plurality of touch electrodes comprising a first touch electrode, a second touch electrode, a third touch electrode, and a fourth touch electrode adjacent to each other,
   wherein the first touch electrode and the third touch electrode are disposed in a first direction and are electrically connected to each other, and the second touch electrode and the fourth touch electrode are disposed in a second direction intersecting the first direction and are electrically connected to each other, and
   wherein a first connecting portion in which the first touch electrode and the third touch electrode are electrically connected and a second connecting portion in which the second touch electrode and the fourth touch electrode are electrically connected intersect and overlap each other while being electrically disconnected from each other.

34. The touch display device according to claim 1, further comprising a touch circuit detecting at least one of a finger or a pen by driving the touch sensor.

* * * * *